United States Patent
Chang et al.

(10) Patent No.: US 11,615,765 B2
(45) Date of Patent: Mar. 28, 2023

(54) DIRECT-LIT LED BACKLIGHT DISPLAY AND LIGHT EMISSION CONTROL METHOD THEREFOR

(71) Applicant: Wistron Corporation, New Taipei (TW)

(72) Inventors: Yao-Tsung Chang, New Taipei (TW); Chuan-Yen Kao, New Taipei (TW); Yu-Lin Chen, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 57 days.

(21) Appl. No.: 17/301,389

(22) Filed: Apr. 1, 2021

(65) Prior Publication Data
US 2022/0230602 A1    Jul. 21, 2022

(30) Foreign Application Priority Data
Jan. 20, 2021 (TW) .................................. 110102201

(51) Int. Cl.
*G09G 5/10* (2006.01)
*G09G 3/34* (2006.01)
(Continued)

(52) U.S. Cl.
CPC .......... *G09G 5/10* (2013.01); *G02F 1/133603* (2013.01); *G09G 3/36* (2013.01);
(Continued)

(58) Field of Classification Search
CPC .... G09G 5/10; G09G 3/36; G09G 2320/0233; G09G 2360/141; G09G 2360/145; G09G 3/342; G09G 3/3426; G02F 1/133603
See application file for complete search history.

(56) References Cited

U.S. PATENT DOCUMENTS

| 6,473,092 B1 * | 10/2002 | Sojourner | H04N 9/315 345/697 |
| 2006/0132053 A1 * | 6/2006 | Cho | G09G 3/3258 315/169.3 |

(Continued)

FOREIGN PATENT DOCUMENTS

| CN | 102568394 B | 7/2012 |
| CN | 102750907 A | 10/2012 |

(Continued)

OTHER PUBLICATIONS

Examination report dated Nov. 24, 2021, listed in related Taiwan patent application No. 110102201.
(Continued)

*Primary Examiner* — Antonio Xavier
(74) *Attorney, Agent, or Firm* — McClure, Qualey & Rodack, LLP

(57) ABSTRACT

A light emission control method is adapted to a direct-lit LED backlight display. The display includes a backlight module, a driving circuit, a detection circuit, and a control circuit. The backlight module includes a first light emission group and a second light emission group. The first light emission group includes a plurality of first LEDs, and the second light emission group includes a plurality of second LEDs. The first LEDs and the second LEDs are in an interleaved arrangement. The driving circuit is activated to selectively drive the first light emission group and the second light emission group to emit light. On detection of an abnormal light-emission status of any of the plurality of LEDs, the detection circuit sends an abnormal signal. The control circuit obtains a shut-down group according to the abnormal signal and actives the driving circuit not to drive the shut-down group to emit light.

20 Claims, 19 Drawing Sheets

(51) Int. Cl.
*G02F 1/13357* (2006.01)
*G09G 3/36* (2006.01)
(52) U.S. Cl.
CPC .............. *G09G 2320/0233* (2013.01); *G09G 2360/141* (2013.01); *G09G 2360/145* (2013.01)

(56) References Cited

U.S. PATENT DOCUMENTS

| | | | |
|---|---|---|---|
| 2009/0147534 A1* | 6/2009 | Hamada | G02B 6/0068 362/612 |
| 2014/0160326 A1* | 6/2014 | Black | H04N 9/04557 348/262 |
| 2014/0173884 A1* | 6/2014 | Lai | H05K 1/0292 29/593 |
| 2014/0247295 A1* | 9/2014 | Hussain | H05B 45/58 315/192 |
| 2017/0061898 A1* | 3/2017 | Takayanagi | H05B 47/11 |
| 2017/0084232 A1* | 3/2017 | Yang | G09G 3/3426 |
| 2017/0150572 A1* | 5/2017 | Zhang | G09G 3/3406 |
| 2018/0212001 A1* | 7/2018 | Bai | H01L 27/18 |
| 2019/0059145 A1* | 2/2019 | Miyoshi | G09G 3/3406 |
| 2021/0003887 A1* | 1/2021 | Liu | G09G 3/3406 |
| 2021/0398499 A1* | 12/2021 | Kim | G09G 3/3225 |
| 2022/0036781 A1* | 2/2022 | Yoda | G09G 3/006 |

FOREIGN PATENT DOCUMENTS

| | | |
|---|---|---|
| CN | 109521603 A | 3/2019 |
| CN | 111583877 A | 8/2020 |
| TW | 201220281 A1 | 5/2012 |

OTHER PUBLICATIONS

Examination report dated Aug. 18, 2022, listed in related Indian patent application No. 202114030292.

* cited by examiner

| Color scale adjustment distribution (X) | Y=X/0.85 | Output result (Z) |
|---|---|---|
| 255 | 308 | 255 |
| 252 | 294 | 255 |
| 240 | 280 | 255 |
| 228 | 266 | 255 |
| 216 | 252 | 252 |
| 204 | 238 | 238 |
| 192 | 224 | 224 |
| 180 | 210 | 210 |
| 168 | 196 | 196 |
| 156 | 182 | 182 |
| 144 | 168 | 168 |
| 132 | 154 | 154 |
| 120 | 140 | 140 |
| 108 | 126 | 126 |
| 96 | 112 | 112 |
| 84 | 98 | 98 |
| 72 | 84 | 84 |
| 60 | 70 | 70 |
| 48 | 56 | 56 |
| 36 | 42 | 42 |
| 24 | 28 | 28 |
| 12 | 14 | 14 |
| 0 | 0 | 0 |

DIRECT-LIT LED BACKLIGHT DISPLAY AND LIGHT EMISSION CONTROL METHOD THEREFOR

CROSS-REFERENCE TO RELATED APPLICATION

This non-provisional application claims priority under 35 U.S.C. § 119(a) to Patent Application No. 110102201 filed in Taiwan, R.O.C. on Jan. 20, 2021, the entire contents of which are hereby incorporated by reference.

BACKGROUND

Technical Field

The present disclosure relates to a liquid-crystal display and a control method, and in particular, to a direct-lit LED backlight display and a light emission control method.

Related Art

Emergence of liquid-crystal display (LCD) products drives the rapid development of a backlight technology. A current backlight technology includes an edge-lit backlight technology and a direct-lit backlight technology. A difference between the two backlight technologies lies in different locations of light-emitting sources in a backlight module, which causes differences in both display brightness and uniformity of a display panel.

For the direct-lit backlight, a backlight module is disposed behind the display panel. Since the display panel is directly illuminated by a rear light source, a direct-lit display has relatively high brightness and uniform light transmission. However, when any of light-emitting diodes (LEDs) in the backlight module is abnormal, obvious non-uniform region brightness occurs on the display panel. In addition, once any of the LEDs in the backlight module is damaged, the entire backlight module needs to be replaced. Some practitioners use a modular backlight module to replace a block in which the abnormal light-emitting diode is located instead of replacing the entire backlight module. Even so, when the abnormality occurs on a display of a client, a customer can only wait for a staff to come to the house for maintenance. The customer has a poor viewing experience before completion of the maintenance.

Alternatively, an abnormal LED is found in the backlight module during pre-delivery inspection of the display panel. Production line personnel can only disassemble and replace the entire display panel. Therefore, maintenance costs are considerable.

SUMMARY

In view of this, according to some embodiments, the present disclosure provides a direct-lit LED backlight display, which can adjust brightness of a backlight module when an LED is abnormal.

According to some embodiments, the direct-lit LED backlight display includes a backlight module, a driving circuit, a detection circuit, and a control circuit. The backlight module includes a first light emission group and a second light emission group. The first light emission group includes a plurality of first LEDs, and the second light emission group includes a plurality of second LEDs. The first LEDs and the second LEDs are in an interleaved arrangement. The driving circuit is coupled to the backlight module and is configured to be activated to selectively drive the first light emission group and the second light emission group to emit light. The detection circuit is configured to detect a light emission status of the LEDs. The detection circuit sends an abnormal signal on detection of an abnormal status of any of the LEDs in first light emission group or second light emission group. The control circuit is coupled to the driving circuit and the detection circuit. The control circuit obtains, according to the abnormal signal, a shut-down group which is a light emission group to which the abnormal LED belongs, and the control circuit activates the driving circuit not to drive the shut-down group to emit light.

In some embodiments, the backlight module further includes a third light emission group. The third light emission group includes a plurality of third LEDs, and the first LEDs, the second LEDs, and the third LEDs are in an interleaved arrangement.

In some embodiments, the backlight module further includes a fourth light emission group. The fourth light emission group includes a plurality of fourth LEDs, and the first LEDs, the second LEDs, the third LEDs, and the fourth LEDs are in an interleaved arrangement.

In some embodiments, the shut-down group includes at least any of the first light emission group, the second light emission group, the third light emission group, and the fourth light emission group.

In some embodiments, the backlight module further includes a fifth light emission group, a sixth light emission group, a seventh light emission group, and an eighth light emission group. The fifth light emission group includes a plurality of fifth LEDs, the sixth light emission group includes a plurality of sixth LEDs, the seventh light emission group includes a plurality of seventh LEDs, and the eighth light emission group includes a plurality of eighth LEDs. The first LEDs, the second LEDs, the third LEDs, the fourth LEDs, the fifth LEDs, the sixth LEDs, the seventh LEDs, and the eighth LEDs are in an interleaved arrangement.

In some embodiments, the shut-down group includes at least any of the first light emission group, the second light emission group, the third light emission group, the fourth light emission group, the fifth light emission group, the sixth light emission group, the seventh light emission group, and the eighth light emission group.

In some embodiments, the interleaved arrangement is a slant arrangement, a translational arrangement, or a diamond-shaped arrangement of the first light emission group and the second light emission group.

The interleaved arrangement is a slant arrangement, a translational arrangement, or a diamond-shaped arrangement of the first light emission group and the second light emission group.

In some embodiments, the backlight module includes a first region, a second region, and a region boundary. The first region is adjacent to the second region, the region boundary is at a position where the first region is adjacent to the second region, the first region has the first light emission group and the second light emission group, and the second region has the first light emission group and the second light emission group.

In some embodiments, when the detection circuit detects the abnormal status of any of the LEDs in the region boundary, the control circuit activates, according to the abnormal signal, the driving circuit not to drive the shut-down group of the first region and the shut-down group of the second region.

In some embodiments, the direct-lit LED backlight display further includes a brightness detection assembly. The brightness detection assembly is coupled to the control circuit and obtains an output brightness value of the backlight module.

In some embodiments, the control circuit obtains a to-be-compensated light emission group according to the output brightness value, and additionally adjusts an operating current or a color scale of the to-be-compensated light emission group according to the output brightness value.

In some embodiments, the direct-lit LED backlight display includes an analog circuit storing at least one analog parameter. The analog circuit is coupled to the control circuit, and the analog parameter indicates the interleaved arrangement, a position of the shut-down group, an operating current of a to-be-compensated light emission group, or an output brightness value of the backlight module.

In some embodiments, the abnormal status is a short status, an open status, an over-voltage status, or an over-current status.

In some embodiments, a light emission control method for a direct-lit backlight diode includes: detecting a light emission status of the LEDs; sending an abnormal signal when the light emission status of any of the LEDs is an abnormal status; obtaining a shut-down group according to the abnormal signal; and disabling the shut-down group from emitting light.

In some embodiments, the step of disabling the shut-down group from emitting light includes: obtaining a first output brightness value of a backlight module; obtaining a to-be-compensated light emission group from the backlight module if the first output brightness value is less than a first brightness threshold; adjusting an operating current of the to-be-compensated light emission group to obtain a second output brightness value of the backlight module; and adjusting a color scale of the to-be-compensated light emission group to obtain a third output brightness value if the second output brightness value is less than a second brightness threshold.

In some embodiments, according to the direct-lit LED backlight display and the light emission control method, the brightness uniformity of the backlight module may be improved through the LEDs at different positions and adjustment of the operating current without replacing the abnormal LED. In some embodiments, brightness and brightness uniformity of the direct-lit LED backlight display can be enhanced through existing various arrangements of LEDs.

BRIEF DESCRIPTION OF THE DRAWINGS

FIG. 10 is a schematic group diagram of a color scale adjustment distribution according to some embodiments.

DETAILED DESCRIPTION

Figure 1:
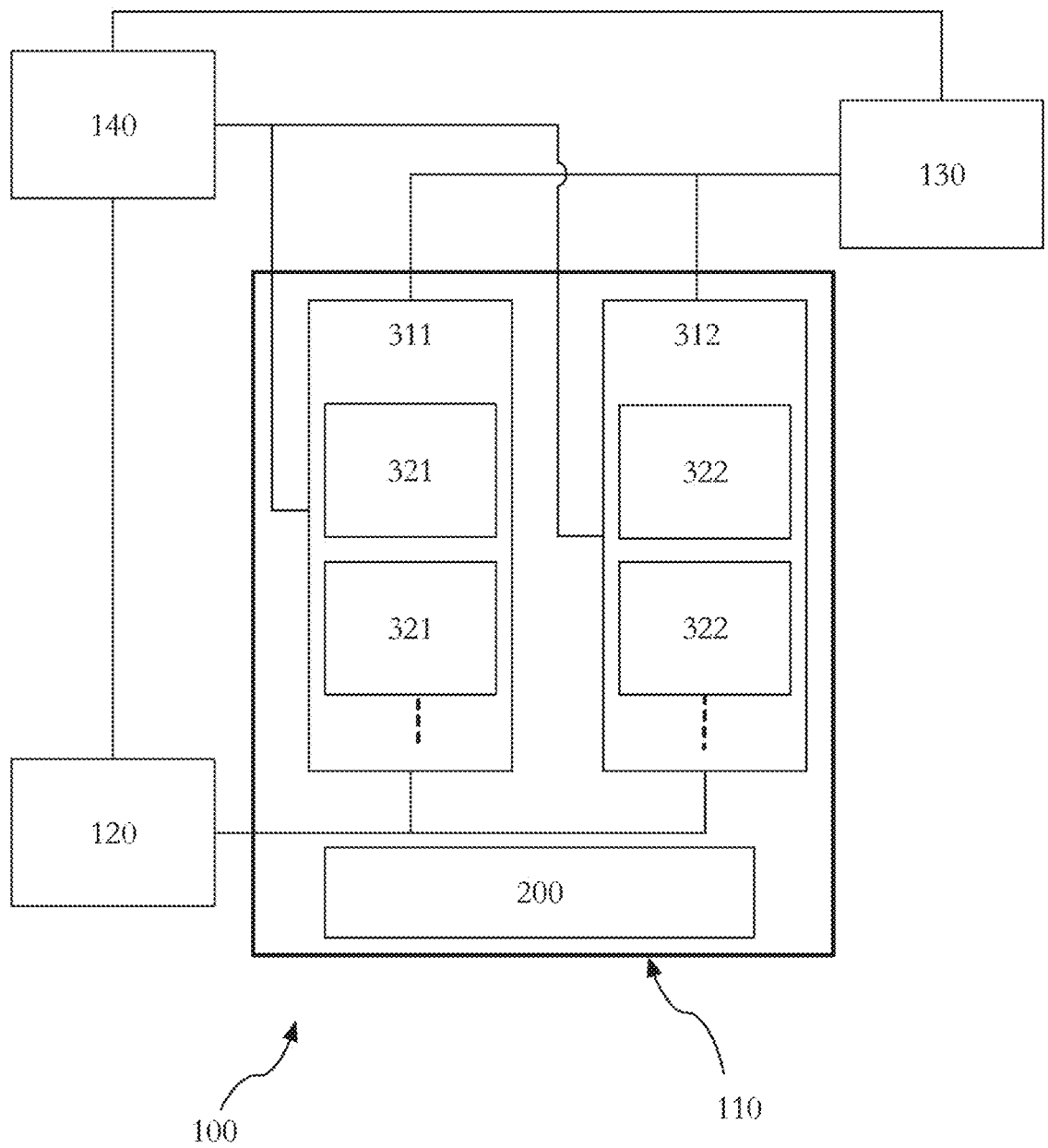
FIG. 1 is a schematic diagram of an architecture of a direct-lit LED backlight display according to some embodiments.

FIG. 1 is a schematic diagram of an architecture of a direct-lit LED backlight display according to some embodiments. The direct-lit LED backlight display 100 includes a backlight module 110, a driving circuit 120, a detection circuit 130, and a control circuit 140. The backlight module 110 is coupled to the driving circuit 120, the detection circuit 130, and the control circuit 140, and the control circuit 140 is coupled to the driving circuit 120 and the detection circuit 130. The backlight module 110 includes a plurality of light-emitting diodes (LEDs). In some embodiments, the backlight module 110 includes a first light emission group 311 and a second light emission group 312. The first light emission group 311 includes a plurality of first LEDs 321, and the second light emission group 312 includes a plurality of second LEDs 322. The first light emission group 311 and the LEDs are coupled to the driving circuit 120, the detection circuit 130, and the control circuit 140, and the second light emission group 312 and the LEDs are coupled to the driving circuit 120, the detection circuit 130, and the control circuit 140. In some embodiments, the backlight module 110 includes a light homogenizing plate 200 located in a light-emitting direction of the first light emission group 311 and the second light emission group 312. The light homogenizing plate 200 controls light scattering directions of the first light emission group 311 and the second light emission group 312 so that the light is uniformly irradiated.

Figure 2A:
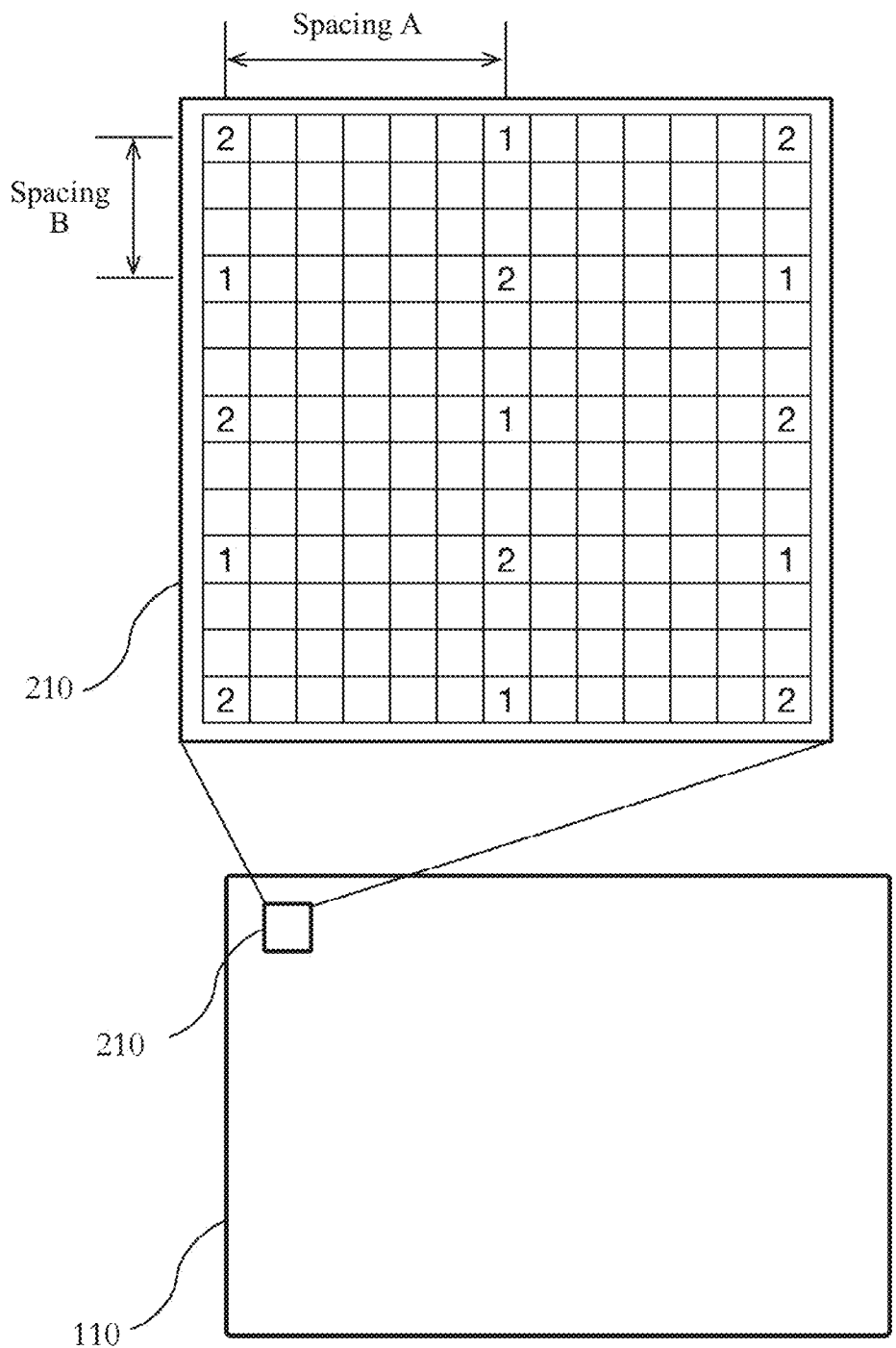
FIG. 2A is a schematic diagram of an interleaved arrangement according to some embodiments.

In some embodiments, each of the first LEDs 321 is a single LED. In some embodiments, each of the first LEDs 321 includes a plurality of LEDs or an LED array. Similarly, the second LEDs 322 may also be composed of a plurality of independent LEDs, or may be an LED array. The first LEDs 321 and the second LEDs 322 are in an interleaved arrangement. Various interleaved arrangements are described in detail later, as shown in FIG. 2A. FIG. 2A is a schematic diagram of an interleaved arrangement according to some embodiments.

Figure 2B:
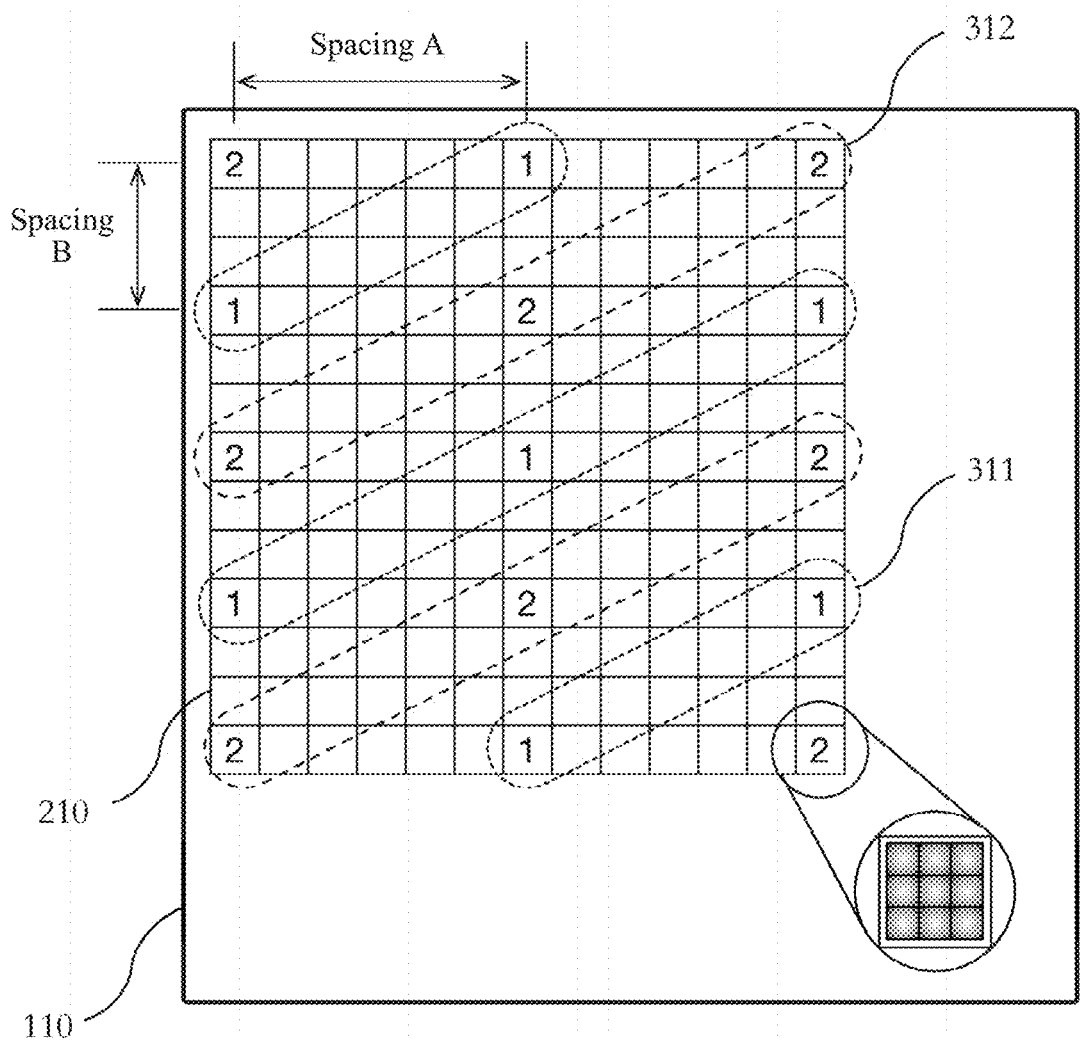
FIG. 2B is a schematic diagram of an interleaved arrangement according to some embodiments.

Generally, the LEDs of the backlight module 110 may be regarded as a two-dimensional array arrangement. For brevity of description, a region is randomly selected in the backlight module 110, as shown in FIG. 2A and FIG. 2B. The selected region is referred to as a selection region 210 herein, and the selection region 210 may be selected from any position of the backlight module 110. The present disclosure is not limited thereto. An array grid in the selection region 210 is merely used for indicating a position where the LED may be disposed. However, in practice, a disposing range may be increased or reduced. It is assumed that a longitudinal axis and a horizontal axis of the selection region 210 both have 13 backlight modules 110. Therefore, the selection region 210 may be regarded as a 13*13 two-dimensional array. However, in practice, a number and sizes of the backlight modules 110 are not limited thereto. The selection region 210 may vary according to display panels of different sizes, or the entire group of backlight modules 110 may be regarded as the same selection region 210.

Numbers in the selection region 210 in FIG. 2A represent the positions of the LEDs, and numbers "1" and "2" respectively indicate that the LEDs belong to the first light emission group 311 or the second light emission group 312. In addition, the positions of the number "1" and "2" can represent not only a single LED but also a plurality of LEDs at the positions, as shown in FIG. 2B. For example, a circled location (that is, "2") at a lower right corner of FIG. 2B may be regarded as a 3*3 LED subset (that is, a 3*3 two-dimensional array). The present disclosure is not limited thereto. In embodiments of other light emission groups, the groups are designated the same way for illustration. The interleaved arrangement of the light emission groups in FIG. 2A is described later.

Figure 2C:
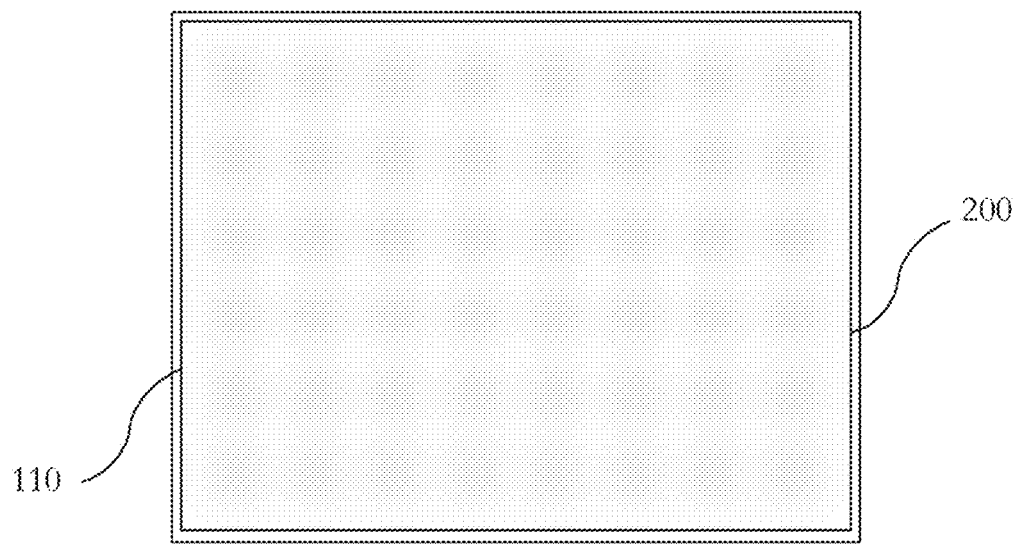
FIG. 2C is a schematic diagram of a brightness distribution pattern presented on a light homogenizing panel by a backlight module according to some embodiments.
Figure 2D:
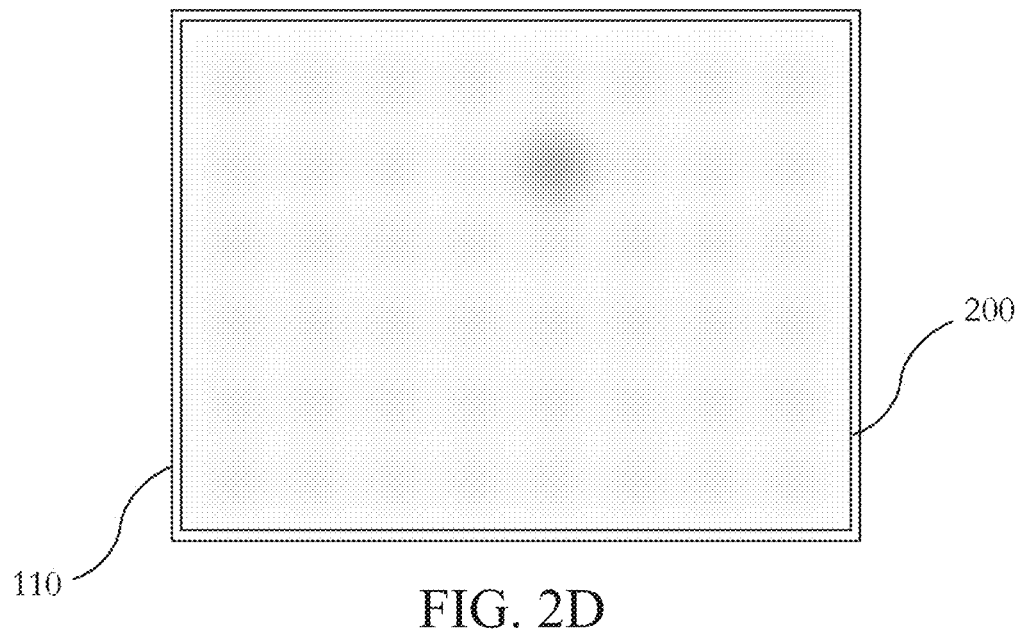
FIG. 2D is a schematic diagram of a brightness distribution pattern of an abnormal LED according to some embodiments.

The backlight module 110 should have a light emission form shown in FIG. 2C under a normal operation. FIG. 2C is a schematic diagram of a brightness distribution pattern presented on a light homogenizing panel 200 by a backlight module 110 according to some embodiments. FIG. 2D is a schematic diagram of a brightness display form when at least one of the LEDs does not work. Due to the scattering of the light homogenizing plate 200, a dark region is formed in the entire backlight module 110.

The driving circuit 120 is configured to drive the LEDs in the backlight module 110 to emit light. The driving circuit 120 may also selectively drive the first light emission group 311 and the second light emission group 312 to emit light according to a corresponding control signal. In other words, the driving circuit 120 drives the first light emission group 311 and the second light emission group 312 to simultaneously emit light, drives one of the first light emission group 311 and the second light emission group 312 to emit light, or drives neither the first light emission group 311 nor the second light emission group 312 to emit light (that is, turns off the first light emission group 311 and the second light emission group 312), according to the control signal. The driving circuit 120 may further adjust an operating current of the LEDs and control polarization of a liquid crystal panel to adjust color brightness of the display. The adjustment is described in detail later.

The detection circuit 130 is coupled to not only the control circuit 140 but also the LEDs. The detection circuit 130 is configured to detect a light emission status (that is, a normal status or an abnormal status) of the LEDs. The abnormal status may be that the LED or a circuit of the LEDs is in an over-voltage status, an over-current status, a short status, or an open status. For the convenience of description in the specification, the above light emission status generally refers to an overall light emission status of the LED and a corresponding circuit thereof. When any of the LEDs is in an abnormal status, the detection circuit 130 sends an abnormal signal to the control circuit 140. In some embodiments, the abnormal signal includes an operating status of the LED and information about the position (such as the first light emission group 311 or the second light emission group 312) of the LED.

The control circuit 140 may learn the abnormal LED and the light emission group to which the LED belongs according to the abnormal signal. The control circuit 140 obtains a shut-down group according to the abnormal signal. The shut-down group includes at least the light emission group to which the above abnormal LED belongs. In some embodiments, the shut-down group may further include other light emission groups having no abnormal LEDs. Taking FIG. 2A as an example, there are a first light emission group 311 and a second light emission group 312 in FIG. 2A. If an LED at a center of FIG. 2A is abnormal, since the LED at the position belongs to the first light emission group 311, the control circuit 140 treats the first light emission group 311 as the shut-down group. The control circuit 140 activates the driving circuit 120 to cause all of the LEDs of the shut-down group not to emit light. In other words, the first light emission group 311 in FIG. 2A is not driven to emit light.

Figure 3:
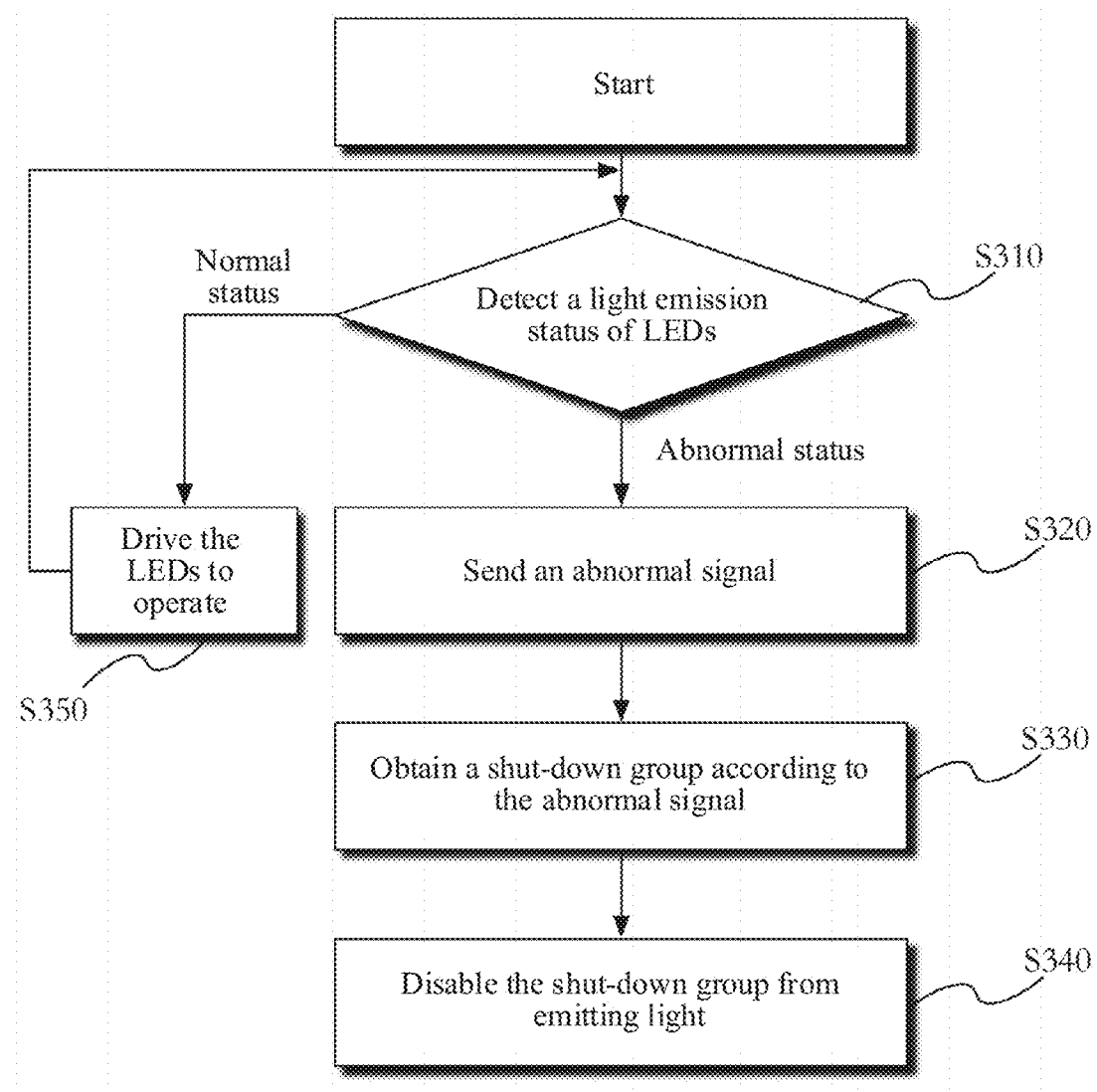
FIG. 3 is a flowchart of a light emission control method for a direct-lit backlight diode according to some embodiments.

For further description of the operation of the present invention, FIG. 3 is a light emission control method for a direct-lit backlight diode according to some embodiments.

The light emission control method for a direct-lit backlight diode includes the following steps.

Step S310: Detect a light emission status of the LEDs.

Step S320: Send an abnormal signal when the light emission status of any of the LEDs is an abnormal status.

Step S330: Obtain a shut-down group according to the abnormal signal.

Step S340: Disable the shut-down group from emitting light.

Step S350: Drive the LEDs to operate if it is detected that the LEDs are normal.

In some embodiments, the backlight module 110 includes at least a first light emission group 311 and a second light emission group 312. In order to facilitate description of the positions of LEDs in each light emission group on the backlight module 110 below, a position of the first light emission group 311 is referred to as a first position, and a position of the second light emission group 312 is referred to as a second position, as shown in FIG. 2A. The first position and the second position are in an interleaved arrangement. The interleaved arrangement mode includes a slant interleaved arrangement, a translational interleaved arrangement, or a diamond-shaped interleaved arrangement. Since the selection region 210 is a part of the range of the backlight module 110 in FIG. 2A, the first light emission group 311 and the second light emission group 312 are also in an interleaved arrangement in other regions of the backlight module 110.

The backlight module 110 (or the selection region 210) is regarded as a two-dimensional array display pattern below to describe various interleaved arrangements. The interleaved arrangement means that LEDs in different light emission groups are disposed at different distances on longitudinal axes and horizontal axes of the backlight module 110 (or of the selection region 210). In FIG. 2A, an arrangement mode for the light emission groups is a diamond-shaped interleaved arrangement. The diamond-shaped interleaving means that the LEDs in different light emission groups are in an interleaved arrangement on the horizontal axes at a spacing of A and on the longitudinal axes at a spacing of B.

A shape of a line obtained after connecting adjacent LEDs of the first light emission group 311 in FIG. 2A may be regarded as a flat rhombus. In such an interleaved arrangement, a principle for connecting two adjacent LEDs is not to span any LED and to form a straight line between two points. Similarly, a shape of a connecting line of the second light emission group 312 in FIG. 2A may also be regarded as another same rhombus. The first light emission group 311 and the second light emission group 312 are in an interleaved arrangement, which is therefore referred to as diamond-shaped interleaving. In addition, the spacings A and B may also be adjusted, so that the shape of the diamond-shaped interleaved arrangement is a rhombus shape with a large spacing in the longitudinal axis and a small spacing in the horizontal axis.

Figure 4A:
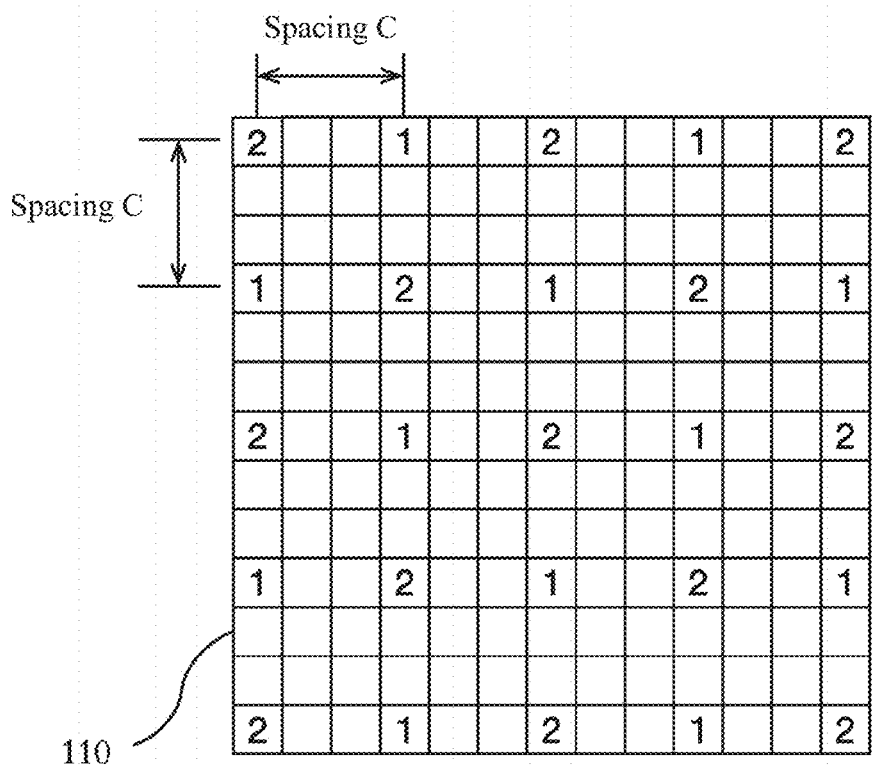
FIG. 4A is a schematic diagram of a slant interleaved arrangement according to some embodiments.

In addition to the diamond-shaped interleaved arrangement, the interleaved arrangement may also be a diagonal interleaved arrangement and a translational interleaved arrangement. For the slant interleaved arrangement, refer to FIG. 4A. FIG. 4A is a schematic diagram of a slant interleaved arrangement according to some embodiments. The LEDs in the light emission groups are in an interleaved arrangement on the longitudinal axes and the horizontal axes of the backlight module 110 at an equal spacing C. Therefore, the LEDs in the first light emission group 311 on the backlight module 110 are connected to form a plurality of lines in a slant arrangement, and the LEDs in the second light emission group 312 are interleaved with the LEDs in the first light emission group 311, as shown in FIG. 4A.

Figure 4B:
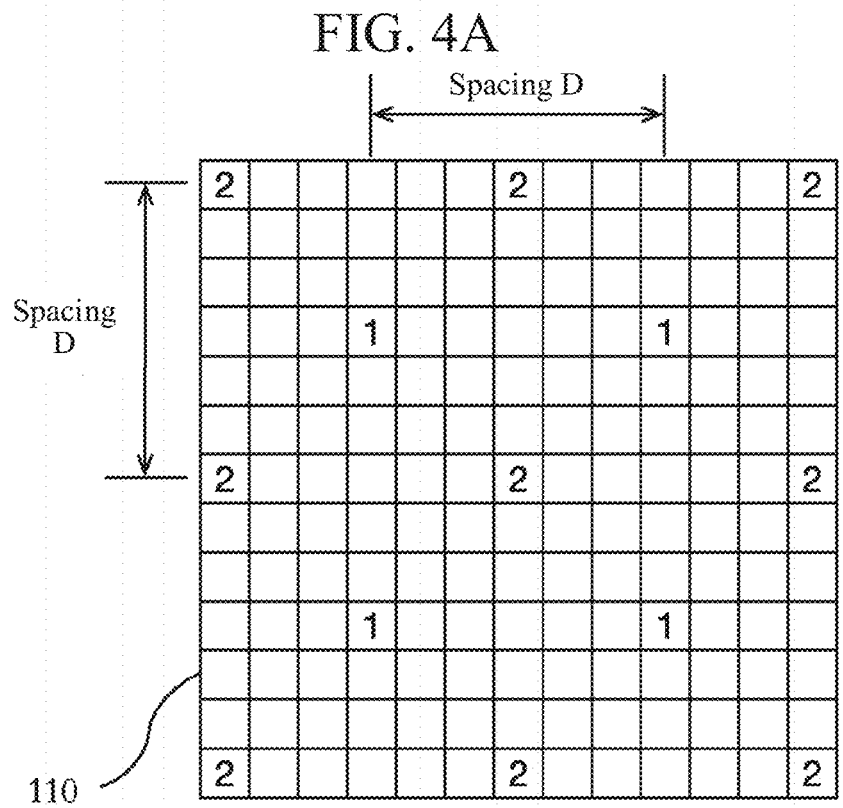
FIG. 4B is a schematic diagram of a translational interleaved arrangement according to some embodiments.

FIG. 4B is a schematic diagram of a translational interleaved arrangement according to some embodiments. The translational arrangement is to select at least two horizontal axis directions (or longitudinal axis directions) in the backlight module 110 to dispose LEDs in the same group at an equal spacing. LEDs in the other light emission group may be disposed in the same axis directions described above at another spacing. The LEDs may also be arranged in the same axis directions but different horizontal axes (or longitudinal axes) at an equal spacing. For example, in FIG. 4B, if the horizontal axis direction is used as a reference, all second LEDs 322 in the horizontal axis directions of the backlight module 110 are disposed at an equal spacing (at a spacing D). The second LEDs 322 are also disposed at an equal spacing in the longitudinal axis directions. Similarly, the first light emission group 311 may also be disposed in the above manner. Therefore, first light emission group 311 and the second light emission group 312 may be regarded as being in a translational interleaved arrangement in the backlight module 110. In addition, in an implementation with more than two light emission groups, any two light emission groups may be in an interleaved arrangement.

Figure 5A:
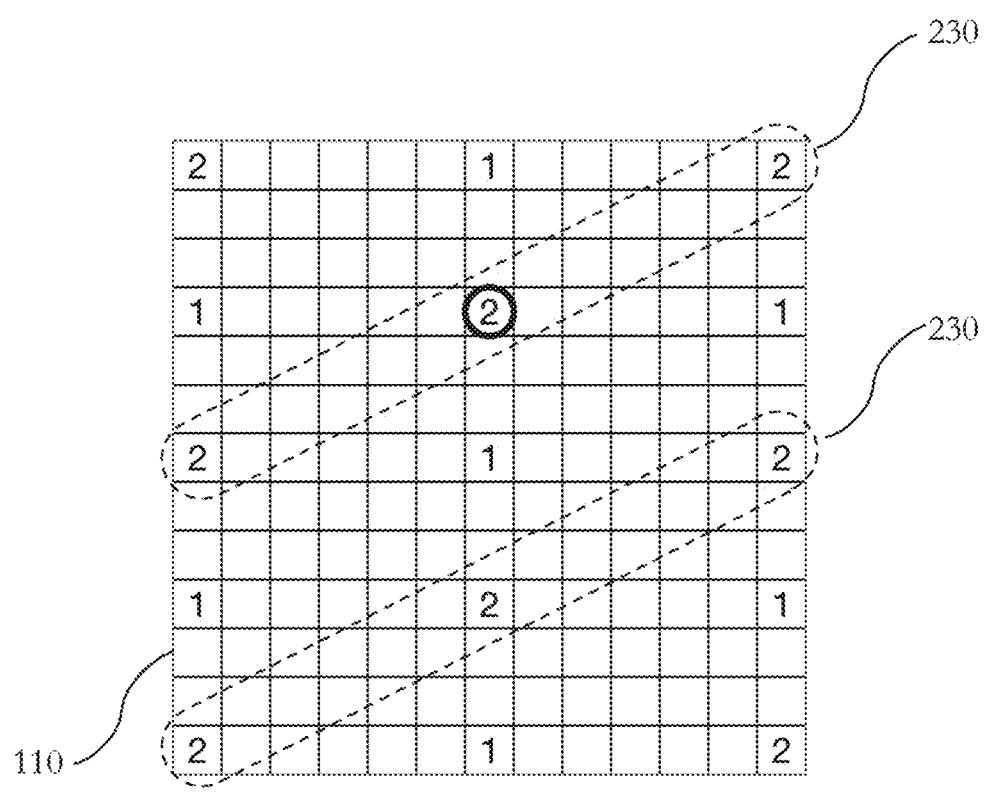
FIG. 5A is a schematic diagram of an abnormal LED according to some embodiments.

When any of the LEDs is in an abnormal status, the detection circuit 130 and the control circuit 140 may make corresponding adjustments according to the abnormal LED and a light emission group to which the LED belongs. For example, in FIG. 2B, it is assumed that any of the LEDs in the second light emission group 312 is detected to be in an abnormal status, and an array in FIG. 2B corresponds to a circled location in FIG. 5B. In FIG. 5A, the LED (belonging to the second light emission group 312) in the abnormal status is indicated by a thick black circle. Therefore, the control circuit 140 treats the second light emission group 312 as a shut-down group 230, as shown in dashed-line boxes in FIG. 5A.

Figure 5B:
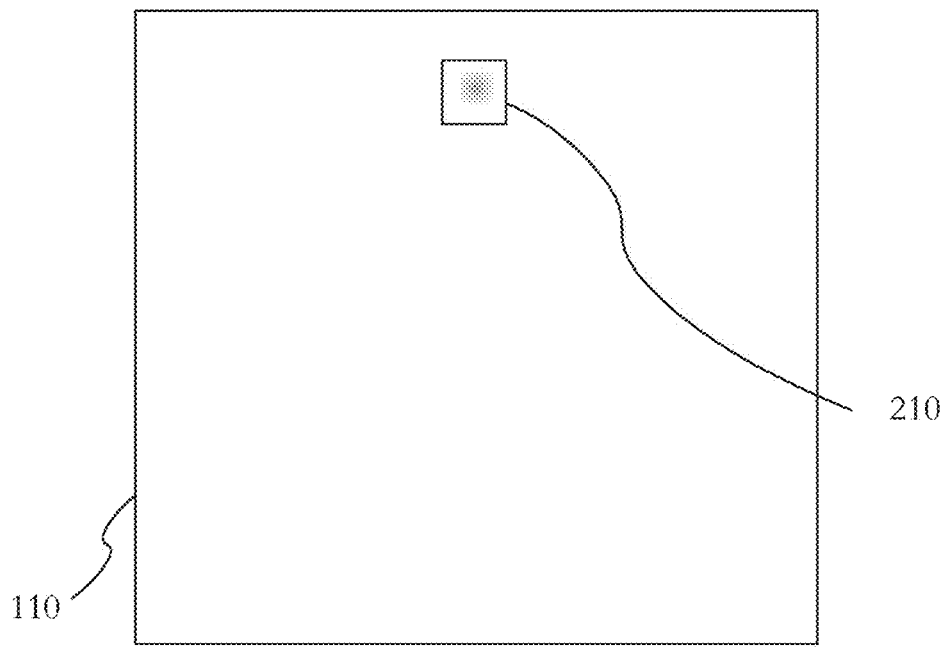
FIG. 5B is a schematic diagram of brightness display corresponding to an abnormal status according to some embodiments.

FIG. 5B is a schematic diagram of brightness display corresponding to an abnormal status according to some embodiments. It is assumed that LEDs in a selection region 210 of FIG. 5B are abnormal. In an embodiment, since the LEDs in the abnormal status present abnormal brightness, a dark region (which may also be a dark spot, a bright region, or a bright spot) appears in the light homogenizing plate 200 under the light homogenizing plate 200. Due to the dark region (or the dark spot) in FIG. 5B, overall brightness uniformity of the backlight module 110 is affected, as shown in FIG. 5B. The brightness uniformity is a comprehensive result obtained according to average brightness, maximum brightness, and minimum brightness of the entire backlight module 110. Therefore, both a distance between the dark and the light emission group and brightness intensity affect the brightness uniformity. In an embodiment, the LED may also emit excessively bright light due to an overcurrent. Therefore, the control circuit 140 controls the driving circuit 120 to disable the light emission group. In more detail, general abnormality only reduces the brightness. In case of excessive brightness caused by the overcurrent, the LED light emission group with excessive brightness is turned off due to over-current protection, causing reduced brightness.

Figure 5C:
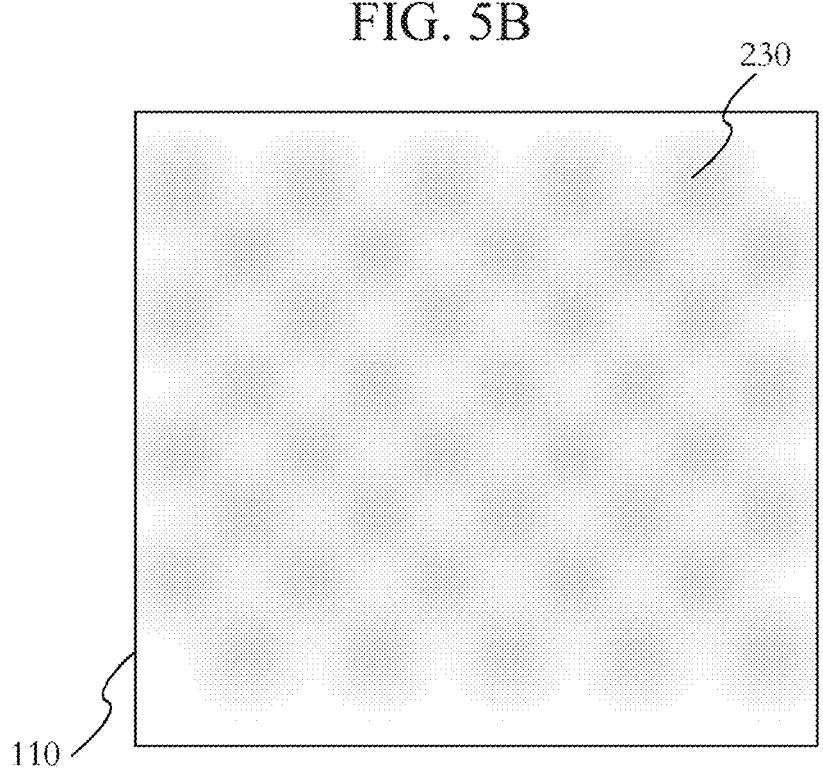
FIG. 5C is a schematic diagram of a light emission status of a backlight module according to some embodiments.

Next, the control circuit 140 treats the second light emission group 312 as a shut-down group 230 according to the abnormal LEDs in the abnormal status. The control circuit 140 activates the driving circuit 120 to disable the shut-down group 230 from emitting light. The backlight module 110 may be in a display status shown in FIG. 5C under the light homogenizing plate 200. FIG. 5C is a schematic diagram of a light emission status of the backlight module 110 according to some embodiments. FIG. 5C shows a display panel that implements the shut-down group 230 according to FIG. 5B. Gray interleaved blocks in FIG. 5C are a plurality of interleaved dark regions formed in the backlight module 110 because the control circuit 140 does not drive the shut-down group 230. Although overall brightness is reduced, brightness uniformity of the backlight module 110 can be improved.

Figure 6A:
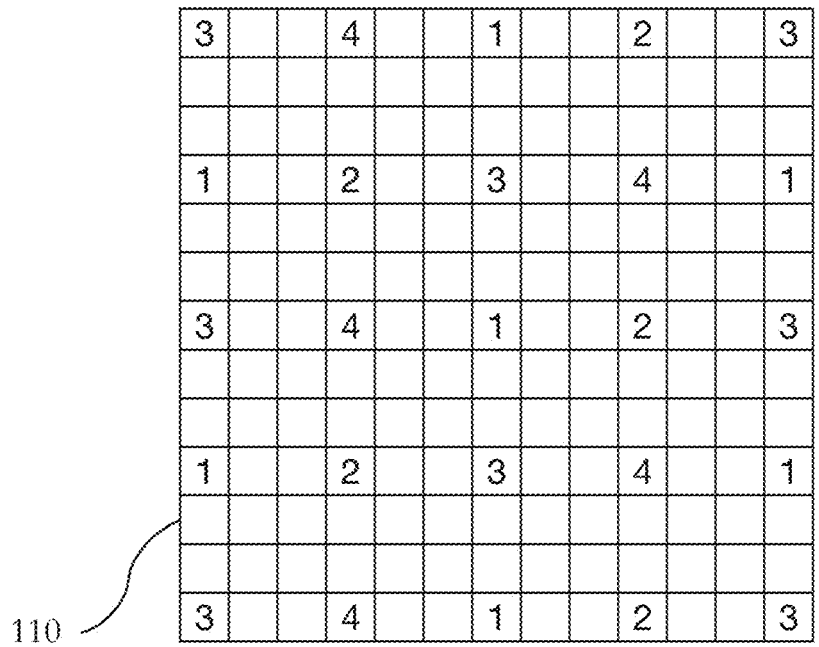
FIG. 6A is a schematic diagram of an interleaved arrangement of a plurality of light emission groups according to some embodiments.
Figure 6B:
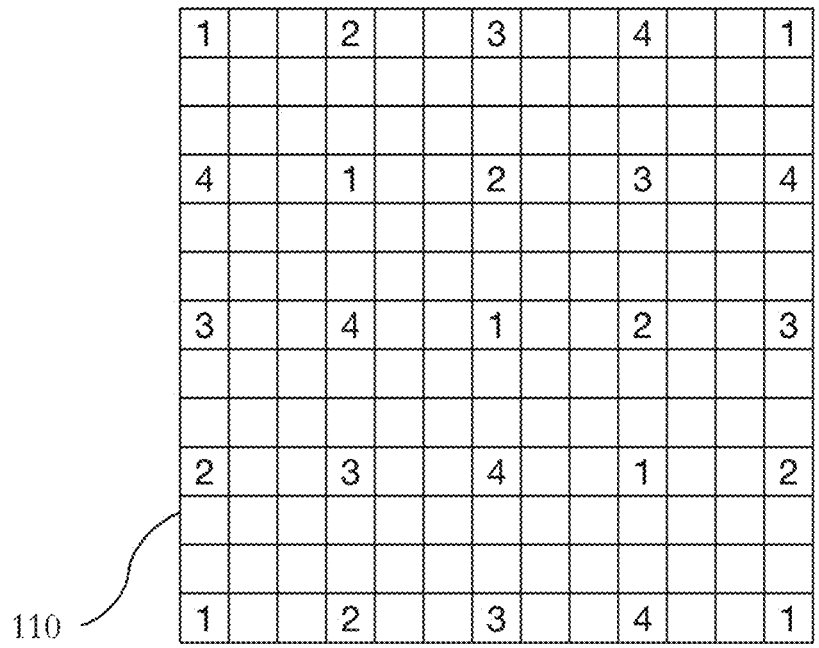
FIG. 6B is a schematic diagram of another interleaved arrangement of a plurality of light emission groups according to some embodiments.
Figure 6C:
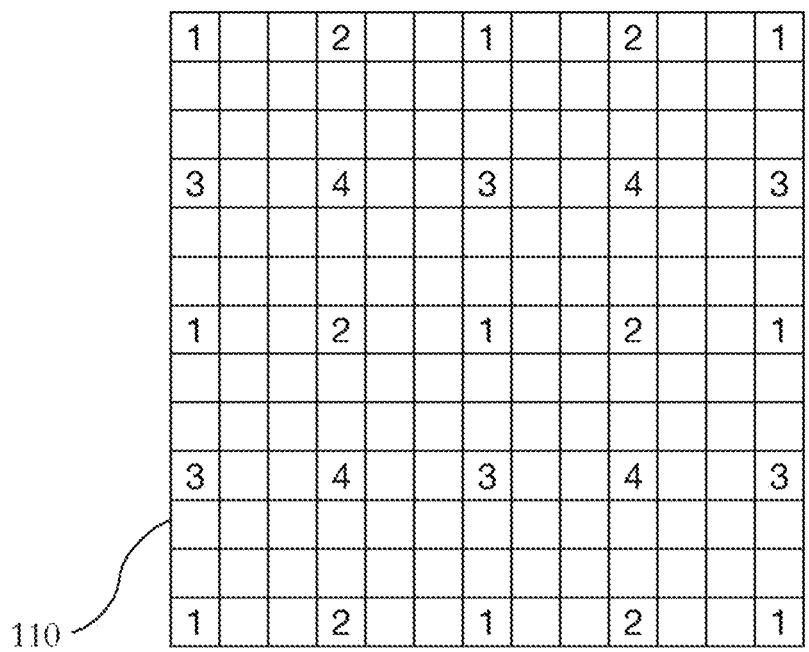
FIG. 6C is a schematic diagram of another interleaved arrangement of a plurality of light emission groups according to some embodiments.

In some embodiments, the backlight module 110 may further include a third light emission group 313 and a fourth light emission group 314. The third light emission group 313 has a plurality of third LEDs 323, and the fourth light emission group 314 has a plurality of fourth LEDs 324. The first LEDs 321, the second LEDs 322, the third LEDs 323, and the fourth LEDs 324 are also interleaved. FIG. 6A, FIG. 6B, and FIG. 6C are schematic diagrams of an interleaved arrangement of a plurality of light emission groups according to some embodiments. In FIG. 6A, the first light emission group 311, the second light emission group 312, the third light emission group 313, and the fourth light emission group 314 are respectively represented by numbers "1", "2", "3", and "4". When the detection circuit 130 detect an abnormal status of any of the LEDs in the first light emission group 311, the second light emission group 312, the third light emission group 313, or the fourth light emission group 314, the detection circuit 130 sends an abnormal signal to the control circuit 140. The control circuit 140 activates the driving circuit 120 to disable the shut-down group 230 from emitting light according to the abnormal signal.

Figure 6D:
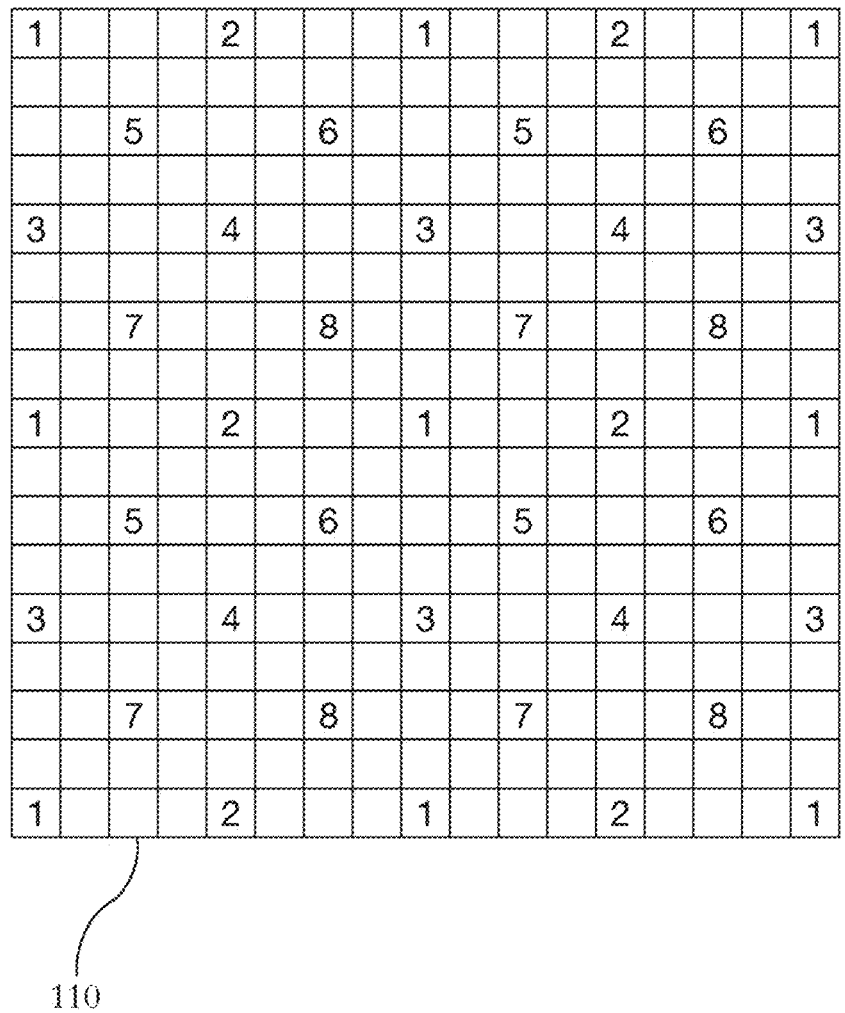
FIG. 6D is a schematic diagram of another interleaved arrangement of a plurality of light emission groups according to some embodiments.

In some embodiments, the backlight module 110 further includes a fifth light emission group 315, a sixth light emission group 316, a seventh light emission group 317, and an eighth light emission group 318. The fifth light emission group 315 includes a plurality of fifth LEDs 325, the sixth light emission group 316 includes a plurality of sixth LEDs 326, the seventh light emission group 317 includes a plurality of seventh LEDs 327, and the eighth light emission group 318 includes a plurality of eighth LEDs 328. The first LEDs 321, the second LEDs 322, the third LEDs 323, the fourth LEDs 324, the fifth LEDs 325, the sixth LEDs 326, the seventh LEDs 327, and the eighth LEDs 328 are in an interleaved arrangement, as shown in FIG. 6D. In FIG. 6D, the first light emission group 311, the second light emission group 312, the third light emission group 313, the fourth light emission group 314, the fifth light emission group 315, the sixth light emission group 316, the seventh light emission group 317, and the eighth light emission group 318 are respectively represented by numbers "1", "2", "3", "4", "5", "6", "7", and "8".

Figure 7:
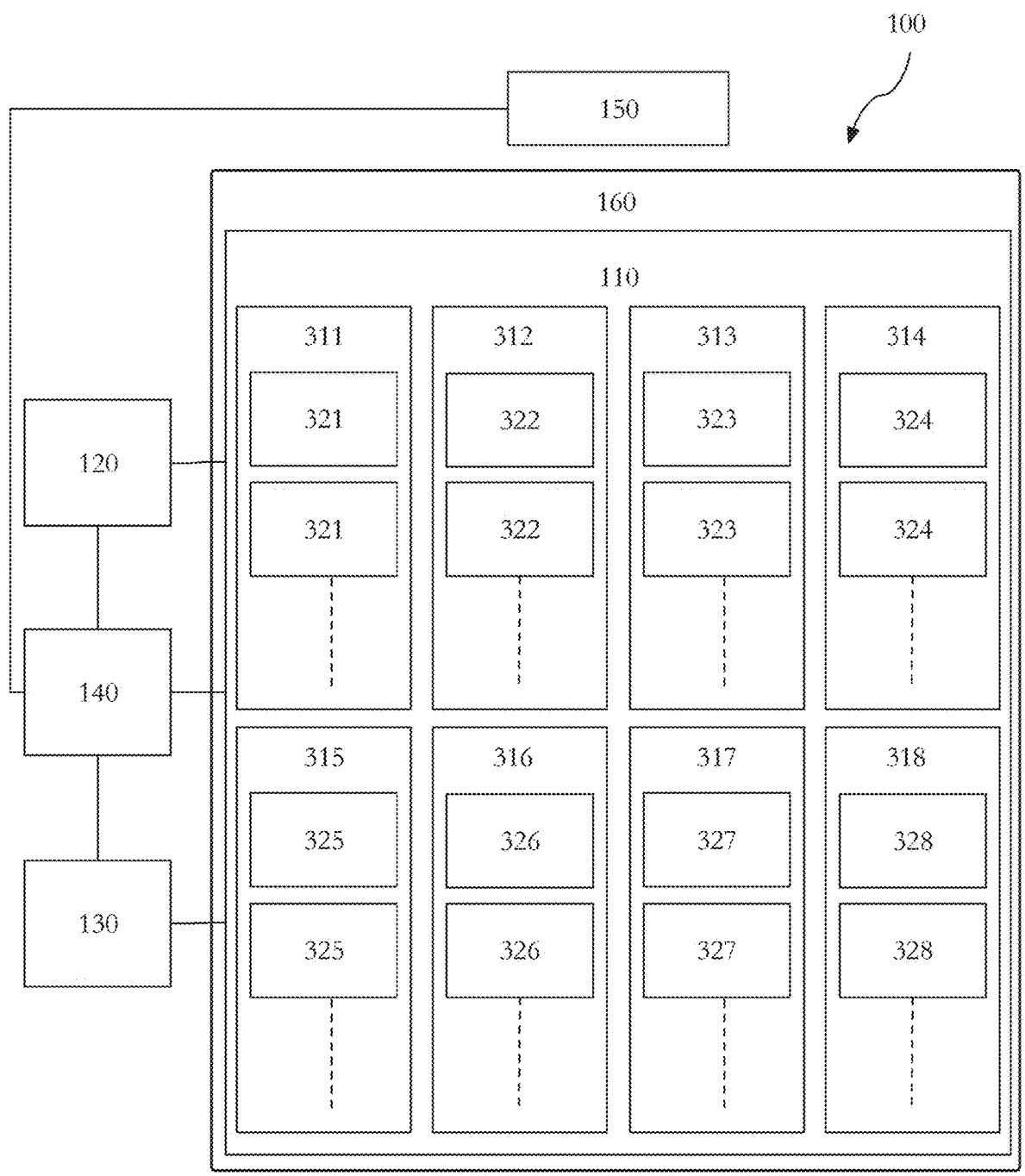
FIG. 7 is a schematic diagram of another system architecture according to some embodiments.

After the control circuit 140 stops driving the shut-down group 230, other light emission groups of the backlight module 110 can still emit light. Therefore, the overall brightness is affected. Therefore, the control circuit 140 needs to further calculate, according to the overall brightness, whether the operating current needs to be adjusted, so as to increase the brightness of the backlight module 110. In some embodiments, the direct-lit LED backlight display 100 includes a backlight module 110, a driving circuit 120, a detection circuit 130, a control circuit 140, a brightness detection assembly 150, and an LCD panel 160, as shown in FIG. 7. In an embodiment, the control circuit 140 may also control a color scale according to the overall brightness. In more detail, adjusting the color scale is to control an amount of light penetrating the backlight module 110 to change the color scale by controlling a rotatory arrangement of liquid crystal molecules in the LCD panel 160 through the control circuit 140 and two polarizing plates with polarized light perpendicular to each other. The backlight module 110 has a plurality of LEDs. In this embodiment, four groups of light emission groups are used for description. For other numbers of light emission groups, brightness compensation may also be performed in this way. The control circuit 140 is coupled to the driving circuit 120, the detection circuit 130, the brightness detection assembly 150, and the LCD panel 160. Both the driving circuit 120 and the detection circuit 130 are coupled to the LEDs.

Figure 8:
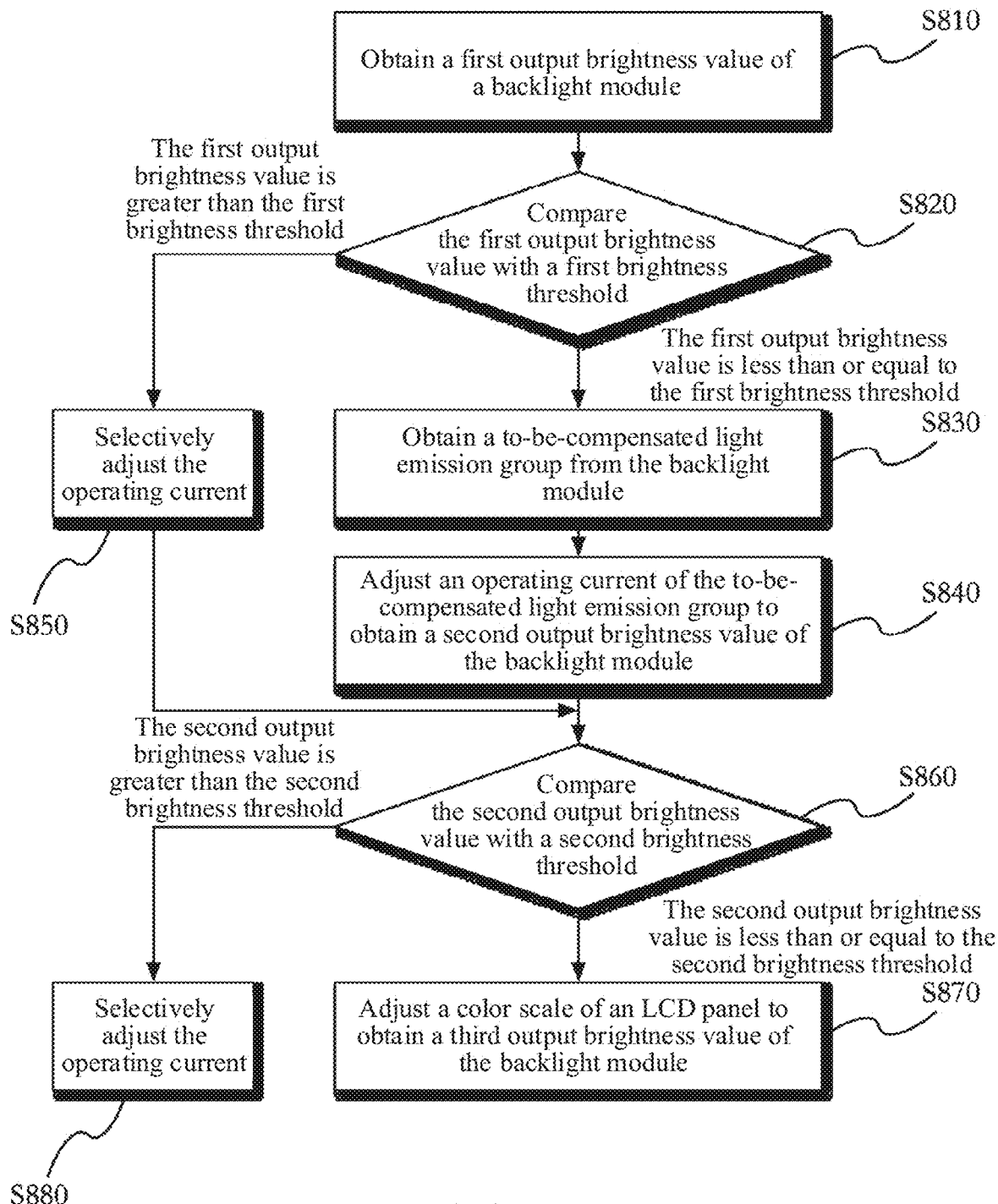
FIG. 8 is a schematic flowchart of a compensation operation according to some embodiments.

The brightness detection assembly 150 detects the adjusted brightness and brightness uniformity of the backlight module 110. The brightness detection assembly 150 may obtain a measured brightness value by means of, for example, a photometer, a color analyzer, a digital camera, or a computing device capable of photographing. In an embodiment, the brightness measurement value may also be obtained by experimenting with various abnormal statuses and compensation methods in advance. It is to be noted that the brightness detection assembly 150 may be directly disposed on a product, externally connected before delivery by a manufacturer, or directly implemented in an analog manner, but the present invention is not limited thereto. In an embodiment in which the brightness detection assembly is disposed on a product, the brightness detection assembly 150 takes a photograph of the backlight module 110 and obtains a first temporarily stored image. The brightness detection assembly 150 obtains a maximum brightness value, a minimum brightness value, and an average brightness value of the backlight module 110 according to the first temporarily stored image and a pixel value thereof. FIG. 8 is a flowchart of a compensation operation according to some embodiments.

The compensation operation in this embodiment includes the following steps.

Step S810: Obtain a first output brightness value of a backlight module;

Step S820: Compare the first output brightness value with a first brightness threshold.

Step S830: Obtain a to-be-compensated light emission group from the backlight module if the first output brightness value is less than or equal to the first brightness threshold.

Step S840: Adjust an operating current of the to-be-compensated light emission group to obtain a second output brightness value of the backlight module.

Step S850: Selectively adjust the operating current if the first output brightness value is greater than the first brightness threshold.

Step S860: Compare a second output brightness value with a second brightness threshold.

Step S870: Adjust a color scale of an LCD panel to obtain a third output brightness value if the second output brightness value is less than or equal to the second brightness threshold.

Step S880: Selectively adjust the operating current if the second output brightness value is greater than the second brightness threshold.

The brightness detection assembly 150 generates a first output brightness value according to the maximum brightness value, the minimum brightness value, and the average brightness value of the first temporarily stored image. Generally, the average brightness value may be directly used as the first output brightness value. A weighted first output brightness value may also be obtained after a weighted value is set for each of the regions of the backlight module 110.

The brightness detection assembly 150 determines whether the first output brightness value is less than the first brightness threshold and sends a detection result to the control circuit 140.

When the first output brightness value is greater than the first brightness threshold, the control circuit 140 may selectively adjust the operating current of the to-be-compensated light emission group. In this case, the control circuit 140 may also not adjust the operating current. When the first output brightness is less than or equal to the first brightness threshold, the control circuit 140 activates the driving circuit 120 so that the driving circuit 120 increases the operating current of the to-be-compensated light emission group, thereby increasing the brightness of the to-be-compensated light emission group. The to-be-compensated light emission group is any or a plurality of the light emission groups except the shut-down group 230. In an embodiment, a compensation upper limit of the operating current is determined according to a number of light emission groups in the shut-down group 230. However, in other embodiments, the compensation upper limit may not be set either. A multiple (C) for compensating the operating current in this embodiment may be determined by using the following formula:

$0 < C \leq 1 + (X/Y)$, where a number of light emission groups in the shut-down group is X; a number of light emission groups in the to-be-compensated light emission group is Y; and a current compensation multiple is C.

Based on the combination of the light emission groups of FIG. 6A, FIG. 6B, FIG. 6C, and FIG. 6D, a corresponding description of compensation for light emission is provided. In case of no LEDs in an abnormal status, brightness display of FIG. 6A, FIG. 6B, FIG. 6C, and FIG. 6D is the same as brightness display of a backlight module 110 located above in FIG. 2C. For the convenience of description, the first light emission group 311 "1" is used as the shut-down group 230 below, for example, and it is determined whether to adjust brightness of the to-be-compensated light emission group.

Figure 9A:
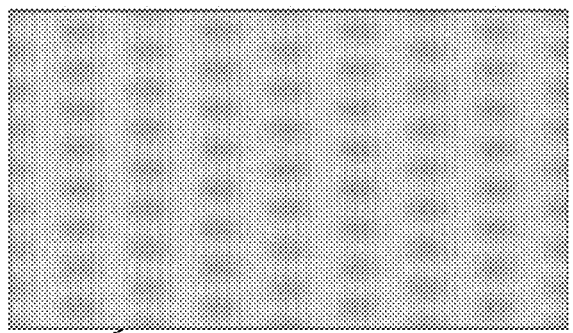
FIG. 9A is a schematic diagram of brightness display of a backlight module according to some embodiments.
Figure 9B:
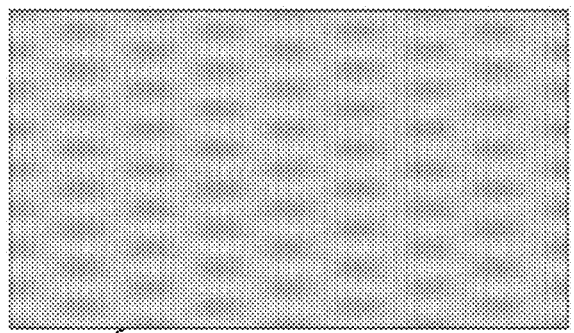
FIG. 9B is a schematic diagram of brightness display of a backlight module according to some embodiments.

The first light emission group 311 in FIG. 6A is used as the shut-down group 230 and is disabled from emitting light, as shown in FIG. 9A. The third light emission group 313 is selected as the to-be-compensated light emission group, and the control circuit 140 increases the operating current of the to-be-compensated light emission group by 1.5 times to increase the brightness of the to-be-compensated light emission group. FIG. 9B shows light emission display of the backlight module 110 after the operating current is increased. In addition, the second light emission group 312 and the fourth light emission group 314 may also be selected as the to-be-compensated light emission group, and the control circuit 140 increases the operating current of the to-be-compensated light emission group by 1.5 times. Generally, as long as the brightness uniformity can be more than 75%, human eyes cannot obviously sense a difference between a bright region and a dark region.

Figure 9C:
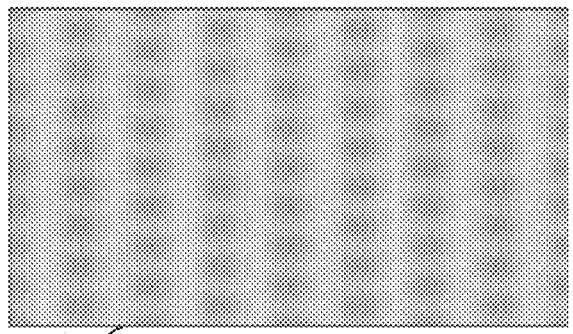
FIG. 9C is a schematic diagram of brightness display of a backlight module according to some embodiments.

FIG. 9C shows light emission display of the backlight module 110 after the operating current is increased. For adjusted brightness of the above shut-down group 230 and the to-be-compensated light emission group, refer to the following Table A. A first column in Table A represents a corresponding light emission group, and rows represent multiples for compensating the operating current. Each straight line indicates whether each light emission group is enabled or adjusted in current in the test run. The compensation current multiple of "0" indicates that the light emission group is the shut-down group 230, and a lower half part of Table A shows average brightness, maximum brightness, minimum brightness, and brightness uniformity of the backlight module 110.

TABLE A

Output records of a to-be compensated light emission group and display brightness

| | Current compensation multiple | | | |
|---|---|---|---|---|
| First light emission group | 1 | 0 | 0 | 0 |
| Second light emission group | 1 | 1 | 1 | 1.5 |
| Third light emission group | 1 | 1 | 1.5 | 1 |
| Fourth light emission group | 1 | 1 | 1 | 1.5 |
| Average brightness | 3.15754 | 2.36717 | 2.76234 | 3.15558 |
| Maximum brightness | 3.21308 | 2.56998 | 3.04928 | 3.51857 |
| Minimum brightness | 3.09746 | 1.99838 | 2.36199 | 2.63398 |
| Brightness uniformity (%) | 96.4 | 77.75 | 77.46 | 74.85 |

Figure 9D:
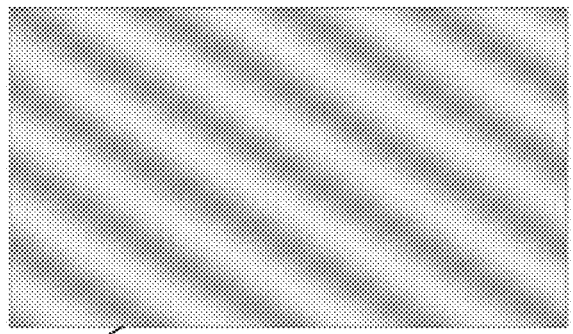
FIG. 9D is a schematic diagram of brightness display of a backlight module according to some embodiments.
Figure 9E:
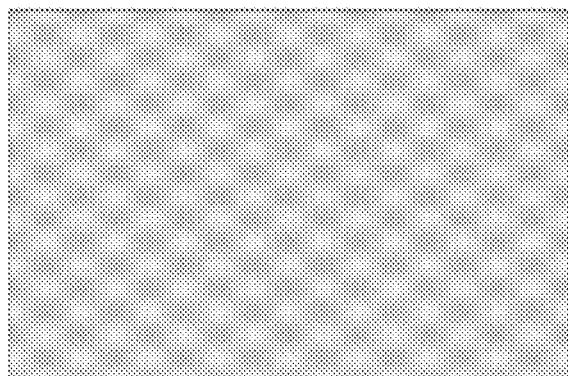
FIG. 9E is a schematic diagram of brightness display of a backlight module according to some embodiments.
Figure 9F:
FIG. 9F is a schematic diagram of brightness display of a backlight module according to some embodiments.

The first light emission group 311 in FIG. 6B is treated as the shut-down group 230 and disabled from emitting light, as shown in FIG. 9D. The control circuit 140 selects the first light emission group 311 and the third light emission group 313 as the shut-down group 230. FIG. 9E shows brightness display after the shut-down group 230 is disabled. In addition, if the second light emission group 312 and the fourth light emission group 314 are selected as the to-be-compensated light emission group, the control circuit 140 increases the operating current of the to-be-compensated light emission group by 1.3 times. FIG. 9F shows light emission display of the backlight module 110 after the operating current is increased.

TABLE B

Output records of a to-be compensated light emission group and display brightness

| | Current compensation multiple | | | |
|---|---|---|---|---|
| First light emission group | 1 | 0 | 0 | 0 |
| Second light emission group | 1 | 1 | 1 | 1.3 |
| Third light emission group | 1 | 1 | 0 | 1 |
| Fourth light emission group | 1 | 1 | 1 | 1.3 |
| Average brightness | 3.15754 | 2.36813 | 1.57876 | 2.84176 |
| Maximum brightness | 3.21308 | 2.7706 | 1.74867 | 3.2507 |
| Minimum brightness | 3.09746 | 1.86677 | 1.44189 | 2.30015 |
| Brightness uniformity (%) | 96.4 | 67.37 | 82.46 | 70.75 |

Figure 9G:
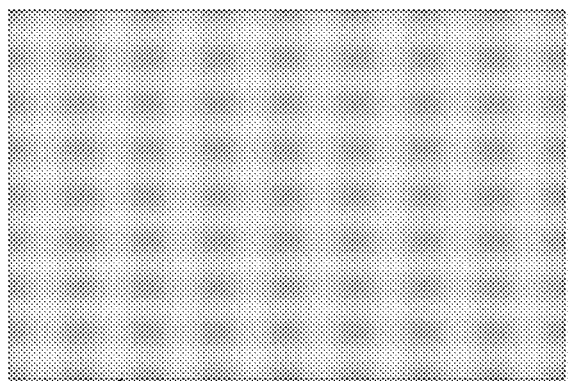
FIG. 9G is a schematic diagram of brightness display of a backlight module according to some embodiments.

The first light emission group 311 in FIG. 6C is treated as the shut-down group 230 and disabled from emitting light, and the operating current is not adjusted, as shown in FIG. 9G. The brightness display of FIG. 9G is interleaved in columns and rows, and overall brightness values are shown in Table C.

TABLE C

Output records of a to-be compensated light emission group and display brightness

| | Current compensation multiple | | | | |
|---|---|---|---|---|---|
| First light emission group | 1 | 0 | 0 | 0 | 0 |
| Second light emission group | 1 | 1 | 1.25 | 1.5 | 1 |
| Third light emission group | 1 | 1 | 1.25 | 1.5 | 1 |
| Fourth light emission group | 1 | 1 | 1 | 1 | 0 |
| Average brightness | 3.15754 | 2.36619 | 2.76088 | 3.15557 | 1.57876 |
| Maximum brightness | 3.21308 | 2.64402 | 3.00881 | 3.37361 | 1.74867 |
| Minimum brightness | 3.09746 | 1.98987 | 2.35102 | 2.71218 | 1.44189 |
| Brightness uniformity (%) | 96.4 | 75.25 | 78.13 | 80.39 | 82.45 |

Figure 9H:
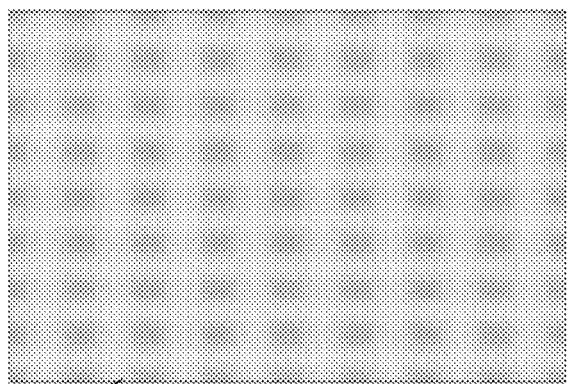
FIG. 9H is a schematic diagram of brightness display of a backlight module according to some embodiments.

If the first light emission group 311 and the fourth light emission group 314 are the shut-down group 230, and the second light emission group 312 and the third light emission group 313 are the to-be-compensated light emission group, the control circuit 140 increases the operating current of the to-be-compensated light emission group by 1.25 times. FIG. 9H shows a light emission display status of the backlight module 110 after compensation. An upper compensation limit of the operating current is based on the number of light emission groups in the shut-down group 230. Due to an effect of the to-be-compensated light emission group, the overall brightness of the backlight module 110 is increased. In addition, in comparison of the brightness uniformity in FIG. 9H with the brightness in FIG. 9G, the brightness uniformity in FIG. 9H is significantly improved, and the brightness uniformity is increased accordingly.

Figure 9I:
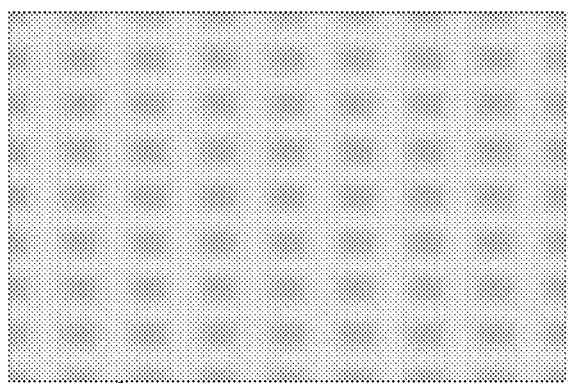
FIG. 9I is a schematic diagram of brightness display of a backlight module according to some embodiments.

Further, the control circuit 140 increases the operating current of the to-be-compensated light emission group to 1.5 times. For the light emission display of the backlight module 110 after compensation, refer to FIG. 9I and Table C. In FIG. 9I, it may be observed that dark regions are reduced due to the influence of the to-be-compensated light emission group, so that the overall brightness and uniformity are improved.

Figure 9J:
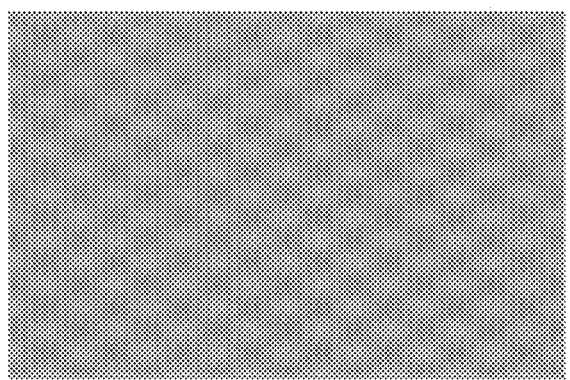
FIG. 9J is a schematic diagram of brightness display of a backlight module according to some embodiments.

If the first light emission group 311 and the fourth light emission group 314 are the shut-down group 230, and the operating current is not to be adjusted, the overall brightness of the backlight module 110 is reduced, as shown in FIG. 9J and the Table. Although the overall brightness of the backlight module 110 of FIG. 9J is greatly reduced, a boundary between the dark region and the bright region is also less obvious. Therefore, the brightness uniformity is improved instead.

Figure 9K:
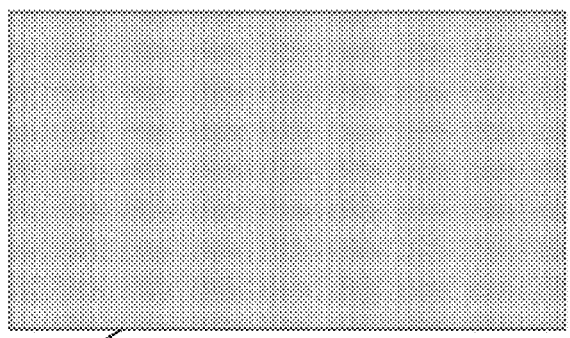
FIG. 9K is a schematic diagram of brightness display of a backlight module according to some embodiments.

FIG. 6D and the light emission group in the figure are used as an example. Eight light emission groups are disposed in FIG. 6D. If the first light emission group 311 is the shut-down group 230, the brightness display of the backlight module 110 is shown in FIG. 9K. The related brightness of the backlight module 110 in FIG. 9K is shown in Table D. Since the backlight module 110 also has other light emission groups, after the shut-down group 230 is disabled, the overall brightness of the backlight module 110 is slightly different from the original brightness.

TABLE D

Output records of a to-be compensated light emission group and display brightness

| | Current compensation multiple | | | | |
|---|---|---|---|---|---|
| First light emission group | 1 | 0 | 0 | 0 | 0 |
| Second light emission group | 1 | 1 | 1 | 1 | 1 |
| Third light emission group | 1 | 1 | 1 | 1 | 1 |
| Fourth light emission group | 1 | 1 | 0 | 1 | 0 |
| Fifth light emission group | 1 | 1 | 1 | 1.25 | 1.25 |
| Sixth light emission group | 1 | 1 | 1 | 1.25 | 1.25 |
| Seventh light emission group | 1 | 1 | 1 | 1.25 | 1.25 |
| Eighth light emission group | 1 | 1 | 1 | 1.25 | 1.25 |
| Average brightness | 6.31509 | 5.52375 | 4.73632 | 6.31314 | 5.52571 |
| Maximum brightness | 6.38859 | 5.83982 | 4.94048 | 6.419 | 5.74256 |
| Minimum brightness | 6.2605 | 5.11229 | 4.55441 | 5.88665 | 5.32878 |
| Brightness uniformity (%) | 97.99 | 87.54 | 92/18 | 88.62 | 92.79 |

Figure 9L:
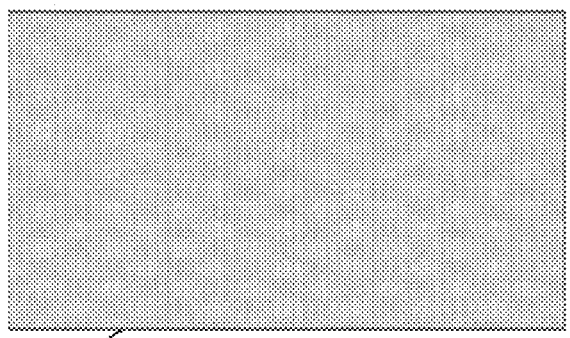
FIG. 9L is a schematic diagram of brightness display of a backlight module according to some embodiments.

If both the first light emission group 311 and the fourth light emission group 314 are the shut-down group 230, and the operating current is not to be adjusted, the brightness display of the backlight module 110 is shown in FIG. 9L. Since the backlight module 110 still has six light emission groups, the overall brightness is merely slightly reduced. However, the brightness uniformity of the backlight module 110 is increased.

Figure 9M:
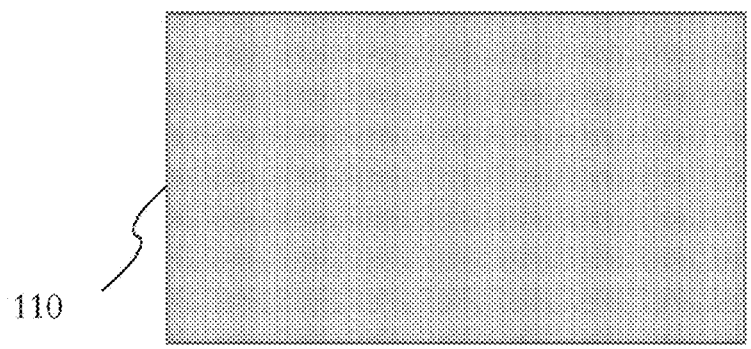
FIG. 9M is a schematic diagram of brightness display of a backlight module according to some embodiments.

Next, the first light emission group 311 is treated as the shut-down group 230, the fifth light emission group 315, the sixth light emission group 316, the seventh light emission group 317, and the eighth light emission group 318 are treated as the to-be-compensated light emission group, and the operating current is increased by 1.25 times. The brightness display of the backlight module 110 after the adjustment is shown in FIG. 9M, and related brightness values of the backlight module 110 are shown in Table D.

Figure 9N:
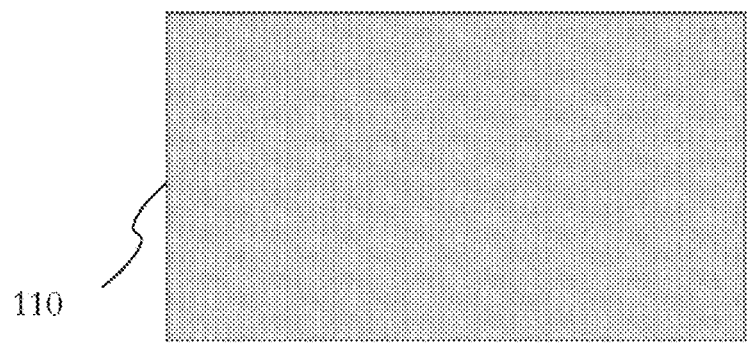
FIG. 9N is a schematic diagram of brightness display of a backlight module according to some embodiments.

It is assumed that the first light emission group 311 and the fourth light emission group 314 are treated as the shut-down group 230, the operating current of the to-be-compensated light emission group is adjusted by 1.25 times, and the to-be-compensated light emission group is the fifth light emission group 315, the sixth light emission group 316, the seventh light emission group 317, and the eighth light emission group 318. Brightness display of the backlight module 110 is shown in FIG. 9N, and related brightness values of the backlight module 110 are shown in Table D.

After the above compensation for the operating current, in some embodiments of the present invention, it may be further determined whether to adjust the color scale. The brightness detection assembly 150 obtains a second temporarily stored image. The second temporarily stored image is a captured image of the to-be-compensated light emission group whose operating current has been increased. Generally, the first temporarily stored image and the second temporarily stored image are captured in the same external environment, for example, an ambient light source, a color temperature, a capturing distance, or a position where the backlight module 110 is captured.

The brightness detection assembly 150 determines whether the second temporarily stored image satisfies a second brightness threshold. If the second output brightness value of the second temporarily stored image is less than or equal to the second brightness threshold, the control circuit 140 adjusts and compensates the color scale of the light emission group according to the output brightness value of the second temporarily stored image. The first brightness threshold and the second brightness threshold may be the same or different. For example, after the operating current of the the to-be-compensated light emission group is increased, the second brightness threshold may be set to be less than the first brightness threshold. If the operating current of the to-be-compensated light emission group is not increased, the second brightness threshold may be set to be equal to or greater than the first brightness threshold.

Adjustment of the color scale is based on adjustment of a quotient between the first output brightness and the original brightness. The original brightness is brightness of the backlight module 110 in a normal status. After the brightness detection assembly 150 obtains the first output brightness, the quotient between the first output brightness and the original brightness may be calculated. The control circuit 140 may compensate for insufficient brightness display by adjusting the color scale. First, an original image with the original brightness is obtained. The control unit generates a scale adjustment distribution group 510 according to the original image, as shown in FIG. 10. A value of the color scale adjustment distribution group 510 in the original image falls between 0 and 255. For the convenience of description, on the left side of FIG. 10, gray scale distribution is used for description. However, in practice, the gray scale distribution may be applied to all color scales of red, green, and blue (RGB). In FIG. 10, "X" is used as an input parameter of the scale distribution, "Y" is an expanded temporarily stored result, and "Z" is a corrected output result.

Color scale distribution in the second temporarily stored image is affected by decreased brightness. As a result, color brightness of the second temporarily stored image decreases, for example, decreases to 0.85 of original brightness. Refer to the brightness correction value "Y" in FIG. 10. The control circuit 140 may expand the color scale distribution to (1/0.85) times through interpolation calculation. For example, the first output brightness of the backlight module 110 obtained after increase of the operating current is merely 85% of the original brightness. The control circuit 140 divides the gray-scale distribution of the original image by 0.85, so that the gray-scale distribution is expanded to a gray-scale value distribution at a middle part of FIG. 10.

For a distribution part exceeding 255 after expansion, the control circuit 140 directly sets the distribution part to 255. An adjusted color scale distribution is shown on the right side of FIG. 10. Referring to FIG. 7, the control circuit 140 may activate liquid crystal molecules of the LCD panel 160 to deflect to emit light according to the new color scale distribution table, so as to increase the brightness of the to-be-compensated light emission group. Similarly, if the first output brightness is greater than the original brightness, the control circuit 140 may adjust the operating current to reduce the light emission brightness of the to-be-compensated light emission group.

Figure 11:
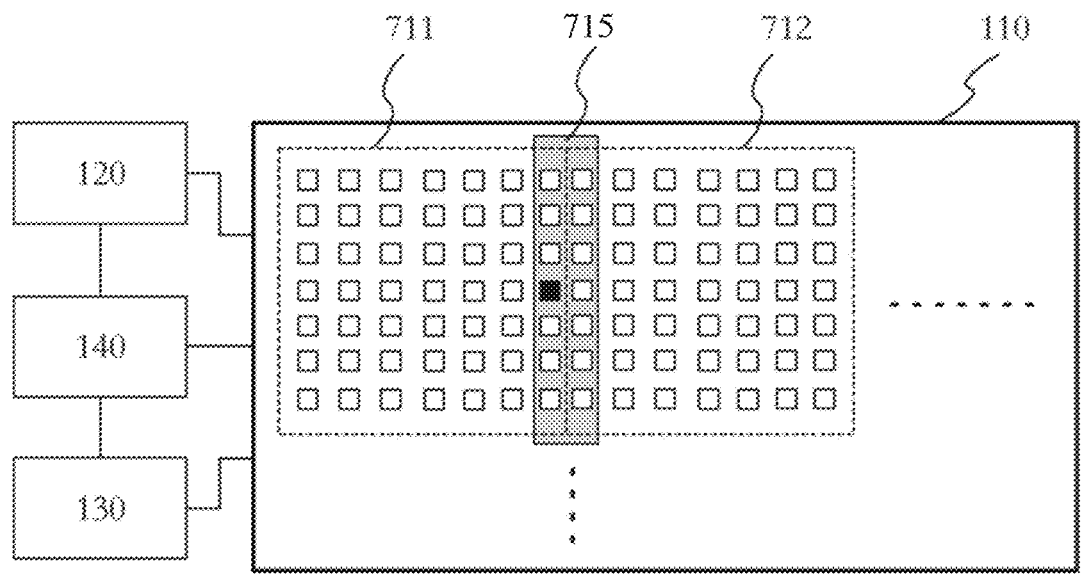
FIG. 11 is a schematic diagram of two regions and region boundaries of the two regions according to some embodiments.

In some embodiments, the backlight module 110 may be further divided into a plurality of small regions. The regions substantially have the same size. The backlight module 110 includes a first region 711 and a second region 712, as shown in FIG. 11. In FIG. 11, a dashed-line frame is used as an edge of the regions. The first region 711 has a first light emission group A1 and a second light emission group A2, and the first light emission group 311 and the second light emission group 312 are in an interleaved arrangement. The second region 712 has a first light emission group B1 and a second light emission group B2. LEDs of the first light emission groups A1 and B1 are arranged at the same position, and LEDs of the second light emission groups A2 and B2 are arranged at the same position.

The first region 711 is coupled to the control circuit 140, the driving circuit 120, and the detection circuit 130, and the second region 712 is coupled to the control circuit 140, the driving circuit 120, and the detection circuit 130. For a way of coupling the control circuit 140, the driving circuit 120, and the detection circuit 130 to the first light emission groups A1, B1 and the second light emission groups A2, B2, refer to FIG. 1. There is a region boundary 715 between the first region 711 and the second region 712. Generally, the region boundary 715 covers a region where the first region 711 is adjacent to the second region 712, as shown in a gray region in FIG. 11. The region boundary 715 in FIG. 11 covers two columns of LEDs where the first region 711 is adjacent to the second region 712. However, in other cases, a range of the region boundary 715 may be adjusted, for example, adjusted to cover four adjacent columns of LEDs.

When an abnormal LED exists in the region boundary 715, the detection circuit 130 sends an abnormal signal to the control circuit 140. The control circuit 140 not only can determine a light emission group to which the LED belongs according to the abnormal signal, but also can determine whether the LED is in the region boundary 715. If the abnormal LED is in the region boundary 715, the control circuit 140 is to perform brightness compensation for the first region 711 and the second region 712 to which the region boundary 715 belongs. A black block in the gray region of FIG. 11 represents the abnormal LED. Conversely, the control circuit 140 controls a shut-down group 230 and a light emission group in the region to which the abnormal LED belongs.

The control circuit 140 treats same light emission groups in the first region 711 and the second region 712 as the shut-down group 230 according to the abnormal LED and the light emission group to which the LED belongs. In other words, when the light emission group to which the abnormal LED belongs is the first light emission group A1, the control circuit 140 treats both the first light emission group A1 and another first light emission group B1 as the shut-down group 230. The driving circuit 120 does not activate the shut-down groups 230 in the first region 711 and the second region 712, so that the shut-down group 230 is disabled from emitting light.

Figure 12:
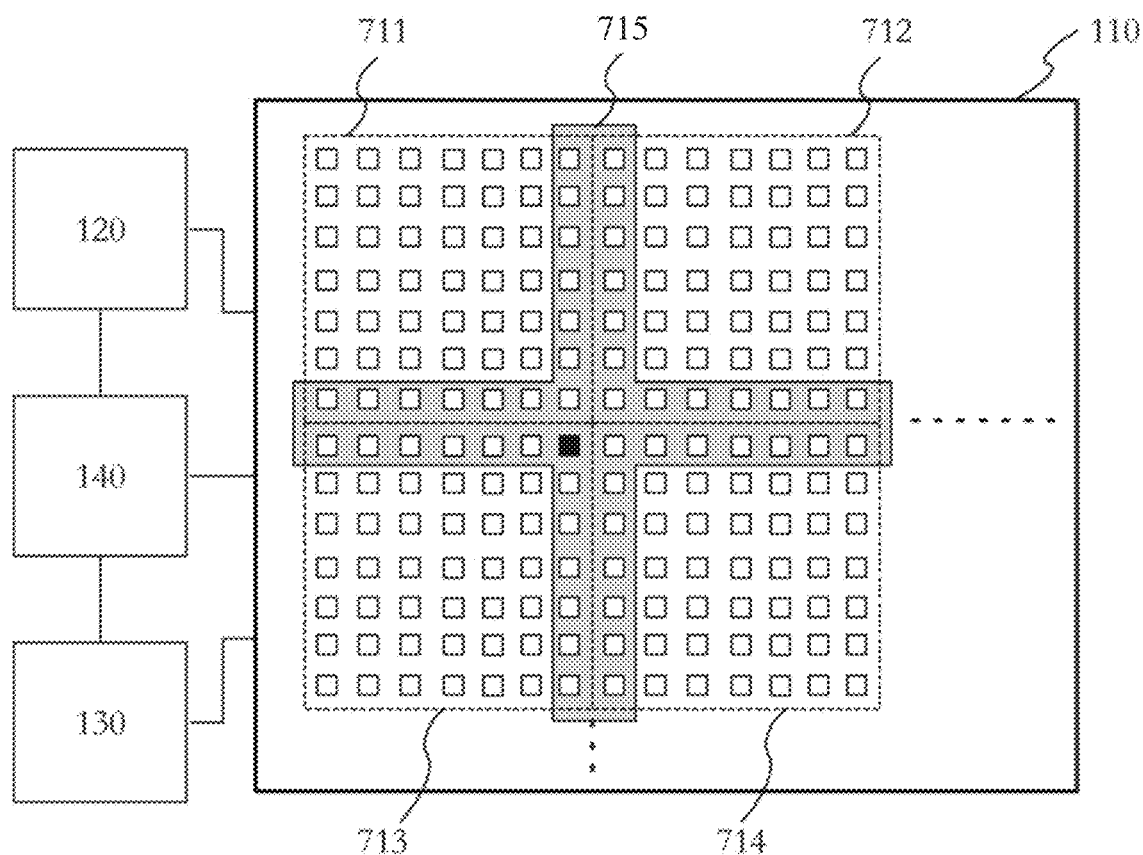
FIG. 12 is a schematic diagram of four regions and region boundaries of the four regions according to some embodiments.

In some embodiments, the backlight module 110 includes a first region 711, a second region 712, a third region 713, and a fourth region 714, as shown in FIG. 12. The first region 711, the second region 712, the third region 713, and the fourth region 714 in the backlight module 110 are in a 2*2 array arrangement. The first region 711 has a first light emission group A1 and a second light emission group A2, the second region 712 has a first light emission group B1 and a second light emission group B2, the third region 713 has a first light emission group C1 and a second light emission group C2, and the fourth region 714 has a first light emission group D1 and a second light emission group D2. For a way of coupling all of the control circuit 140, the driving circuit 120, and the detection circuit 130 to the first light emission groups A1, B1, C1, D1 and the second light emission groups A2, B2, C2, D2, refer to FIG. 1.

If an abnormal LED exists in a region boundary 715, the detection circuit 130 sends an abnormal signal to the control circuit 140, and determines a region to which the region boundary 715 belongs. In FIG. 12, the abnormal LED is in the region boundary 715, and the region boundary 715 covers the first region 711, the second region 712, the third region 713, and the fourth region 714. It is assumed that the abnormal LED belongs to the second light emission group C2 in the third region 713. The control circuit 140 simultaneously calls the second light emission groups A2, B2, C2, D2 of the first region 711, the second region 712, the third region 713, and the fourth region 714, and sets the second light emission groups A2, B2, C2, D2 as the shut-down group 230, so that the second light emission groups A2, B2, C2, D2 are each disabled from emitting light.

Figure 13:
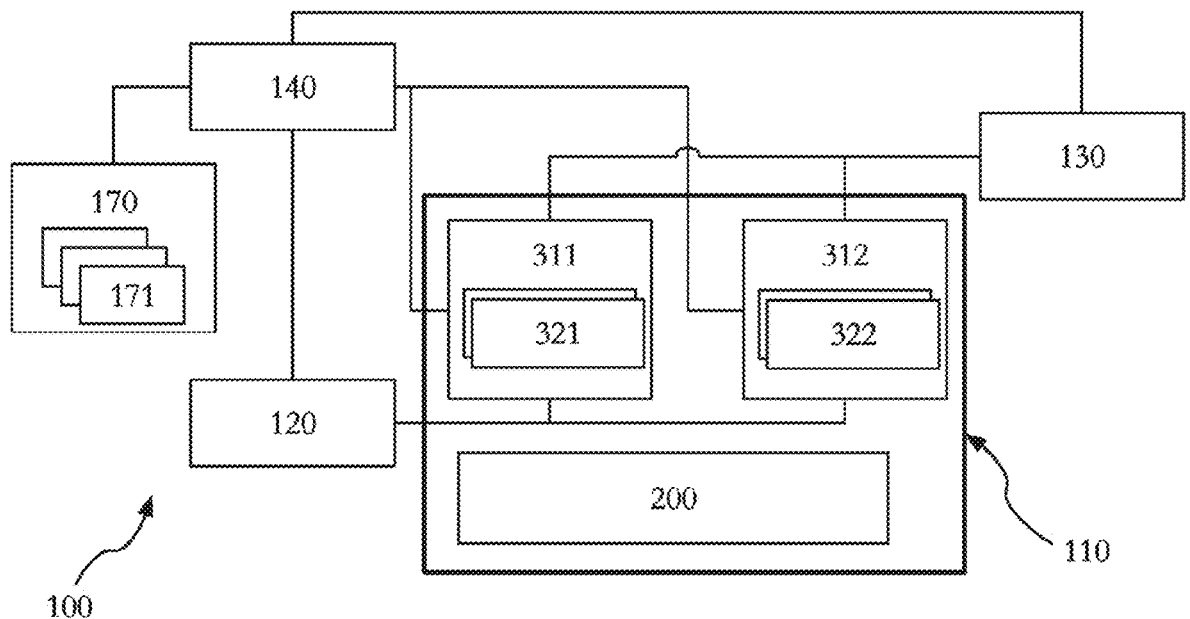
FIG. 13 is a schematic diagram of an architecture of a direct-lit LED backlight display according to some embodiments.

In some embodiments, the direct-lit LED backlight display 100 includes an analog circuit 170, as shown in FIG. 13. The analog circuit 170 is coupled to the control circuit 140, and the analog circuit 170 stores at least one set of analog parameters 171. The analog parameter 171 records at least the interleaved arrangement of the first light emission group 311 and the second light emission group 312, the position of the shut-down group 230, the operating current of the to-be-compensated light emission group, or the output brightness value of the backlight module 110. After the control circuit 140 completes the relevant adjustment of the backlight module 110, the analog circuit 170 immediately records various adjusted values as the analog parameter 171. The analog parameter 171 may be stored in the analog circuit 170, or may be transmitted to a remote server for use by other direct-lit LED backlight displays 100.

If the analog circuit 170 has analog parameters that meet conditions, the control circuit 140 obtains an analog parameter 171 of the corresponding shut-down group 230 from the analog circuit 170 according to the shut-down group 230. For example, the control circuit 140 finds an abnormal LED in the first light emission group 311 and second light emission group 312 both in an interleaved arrangement. The control circuit 140 sets the shut-down group 230 or adjusts the operating current of the light emission group according to the analog parameter.

Figure 14:
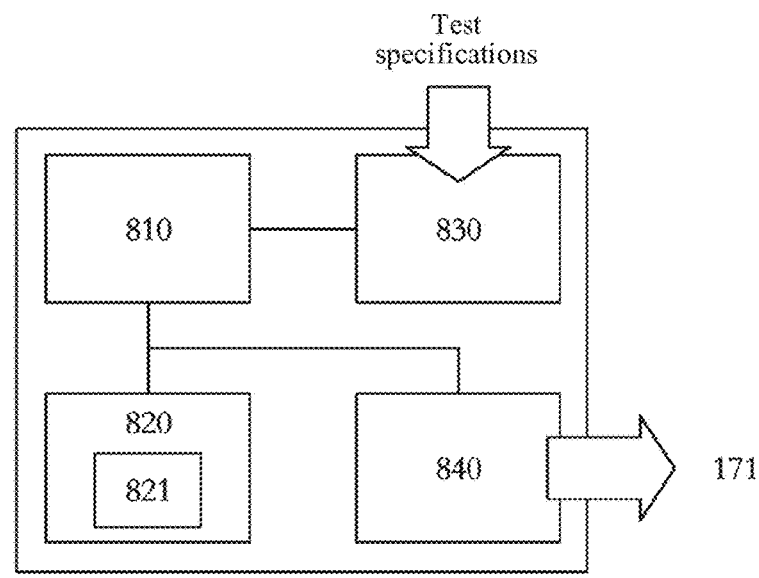
FIG. 14 is a schematic diagram of an architecture of a light emission analog system of a direct-lit backlight diode according to some embodiments.

In some embodiments, a light emission analog system 800 of the direct-lit backlight diode includes a computing assembly 810, a storage assembly 820, an input assembly 830, and an output assembly 840, as shown in FIG. 14. The computing assembly 810 is coupled to the storage assembly 820, the input assembly 830, and the output assembly 840. The storage assembly 820 stores a brightness analog program 821. The brightness analog program 821 is used to simulate brightness, uniformity, or color scales of the direct-lit LED backlight display 100 at operating currents of different intensities. The input assembly 830 receives test specifications. The test specifications include various attributes of the direct-lit LED backlight display 100, for example, a type, a number, and an arrangement of LEDs, a size of the backlight module, the operating current, the brightness detection value, and the like. The output assembly 840 is configured to play a simulated screen of the brightness analog program 821.

Referring to FIG. 8, the computing assembly 810 receives the test specifications through the input assembly 830. The computing assembly 810 executes the brightness analog program 821 according to the test specifications, and loads the test specifications into the brightness analog program 821. The computing assembly 810 may obtain a simulated backlight module 110 and a first output brightness value thereof. In addition, the computing assembly 810 may also select, according to the test specifications, an abnormal LED and a shut-down group 230 to which the LED belongs.

When the computing assembly 810 determines that the first output brightness value is less than or equal to the first brightness threshold, the computing assembly 810 selects any or a plurality of the light emission groups except the shut-down group 230 as the to-be-compensated light emission group. The computing assembly 810 adjusts an operating current of the to-be-compensated light emission group to obtain a second output brightness value of the backlight module 110. The computing assembly 810 compares a second output brightness value with the second brightness threshold. The computing assembly 810 adjusts a color scale of the LCD panel 160 to obtain a third output brightness value if the second output brightness is less than or equal to the second brightness threshold. If the second output brightness is greater than the second brightness threshold, the computing assembly 810 may selectively adjust the operating current or the color scale and records the value as the analog parameter 171. The computing assembly 810 may store analog parameters 171 corresponding to various abnormal statuses into the storage assembly 820.

According to some embodiments, according to the direct-lit LED backlight display 100 and the light emission control method, the uniformity of the backlight module 110 may be improved through the LEDs at different positions and adjustment of the operating current without replacing the abnormal LED. According to some embodiments, the direct-lit LED backlight display 100 not only can reduce costs of replacing or repairing the backlight module 110, but also can achieve brightness enhancement and brightness uniformity through various existing LED arrangements.

What is claimed is:

1. A direct-lit light-emitting diode (LED) backlight display, comprising:
   a backlight module having a first light emission group and a second light emission group, wherein the first light emission group comprises a plurality of first LEDs, and the second light emission group comprises a plurality of second LEDs, wherein the first LEDs and the second LEDs are in an interleaved arrangement, wherein the interleaved arrangement means that the plurality of LEDs in the first light emission group and the second light emission group are disposed at different distances on longitudinal axes and horizontal axes of the backlight module;
   a driving circuit coupled to the backlight module and configured to be activated to selectively drive the first light emission group and the second light emission group to emit light;
   a detection circuit coupled to the backlight module, wherein the detection circuit sends an abnormal signal on detection of an abnormal status of any of the LEDs in the first light emission group or the second light emission group; and a control circuit coupled to the driving circuit and the detection circuit, wherein the control circuit obtains, according to the abnormal signal, a shut-down group which comprises at least the light emission group to which the abnormal LED belongs, and activates the driving circuit not to drive the shut-down group to emit light.

2. The direct-lit LED backlight display according to claim 1, wherein the interleaved arrangement is a slant arrangement, a translational arrangement or a diamond-shaped arrangement of the first light emission group and the second light emission group.

3. The direct-lit LED backlight display according to claim 1, wherein the backlight module further comprises a third light emission group, wherein the third light emission group comprises a plurality of third LEDs, and the first LEDs, the second LEDs, and the third LEDs are in an interleaved arrangement.

4. The direct-lit LED backlight display according to claim 3, wherein the backlight module further comprises a fourth light emission group, wherein the fourth light emission group comprises a plurality of fourth LEDs, and the first LEDs, the second LEDs, the third LEDs, and the fourth LEDs are in an interleaved arrangement.

5. The direct-lit LED backlight display according to claim 4, wherein the shut-down group comprises at least any of the first light emission group, the second light emission group, the third light emission group, or the fourth light emission group.

6. The direct-lit LED backlight display according to claim 4, wherein the interleaved arrangement is a slant arrangement, a translational arrangement, or a diamond-shaped arrangement of the first light emission group, the second light emission group, the third light emission group, and the fourth light emission group.

7. The direct-lit LED backlight display according to claim 4, wherein the backlight module further comprises a fifth light emission group, a sixth light emission group, a seventh light emission group, and an eighth light emission group, wherein the fifth light emission group comprises a plurality of fifth LEDs, the sixth light emission group comprises a plurality of sixth LEDs, the seventh light emission group comprises a plurality of seventh LEDs, and the eighth light emission group comprises a plurality of eighth LEDs, and the first LEDs, the second LEDs, the third LEDs, the fourth LEDs, the fifth LEDs, the sixth LEDs, the seventh LEDs, and the eighth LEDs are in an interleaved arrangement.

8. The direct-lit LED backlight display according to claim 7, wherein the shut-down group comprises at least any of the first light emission group, the second light emission group, the third light emission group, the fourth light emission group, the fifth light emission group, the sixth light emission group, the seventh light emission group, or the eighth light emission group.

9. The direct-lit LED backlight display according to claim 8, wherein the interleaved arrangement is a slant arrangement, a translational arrangement, or a diamond-shaped arrangement of the first light emission group, the second light emission group, the third light emission group, the fourth light emission group, the fifth light emission group, the sixth light emission group, the seventh light emission group, and the eighth light emission group.

10. The direct-lit LED backlight display according to claim 1, wherein the backlight module comprises a first region, a second region, and a region boundary, wherein the first region is adjacent to the second region, the region boundary is located where the first region is adjacent to the second region, the first region has the first light emission group and the second light emission group, and the second region has the first light emission group and the second light emission group.

11. The direct-lit LED backlight display according to claim 1, comprising an analog circuit storing at least one analog parameter, wherein the analog circuit is coupled to the control circuit, and the analog parameter indicates the interleaved arrangement, a position of the shut-down group, an operating current of a to-be-compensated light emission group, or an output brightness value of the backlight module.

12. The direct-lit LED backlight display according to claim 11, wherein the control circuit obtains the analog parameter corresponding to the shut-down group from the analog circuit according to the shut-down group.

13. The direct-lit LED backlight display according to claim 1, wherein the abnormal status is a short status, an open status, an over-voltage status, or an over-current status.

14. A direct-lit light-emitting diode (LED) backlight display, comprising:

a backlight module having a first light emission group and a second light emission group, wherein the first light emission group comprises a plurality of first LEDs, and the second light emission group comprises a plurality of second LEDs, wherein the first LEDs and the second LEDs are in an interleaved arrangement;

a driving circuit coupled to the backlight module and configured to be activated to selectively drive the first light emission group and the second light emission group to emit light;

a detection circuit coupled to the backlight module, wherein the detection circuit sends an abnormal signal on detection of an abnormal status of any of the LEDs in the first light emission group or the second light emission group; and a control circuit coupled to the driving circuit and the detection circuit, wherein the control circuit obtains, according to the abnormal signal, a shut-down group which comprises at least the light emission group to which the abnormal LED belongs, and activates the driving circuit not to drive the shut-down group to emit light;

wherein the backlight module comprises a first region, a second region, and a region boundary, wherein the first region is adjacent to the second region, the region boundary is located where the first region is adjacent to the second region, the first region has the first light emission group and the second light emission group, and the second region has the first light emission group and the second light emission group;

wherein when the detection circuit detects the abnormal status of any of LEDs in the region boundary, the control circuit activates, according to the abnormal signal, the driving circuit not to drive the shut-down group of the first region and the shut-down group of the second region.

15. The direct-lit LED backlight display according to claim 1, further comprising a brightness detection assembly coupled to the control circuit and configured to obtain an output brightness value of the backlight module.

16. The direct-lit LED backlight display according to claim 15, wherein the control circuit obtains a to-be-compensated light emission group according to the output brightness value and additionally adjusts an operating current of the to-be-compensated light emission group according to the output brightness value.

17. The direct-lit LED backlight display according to claim 15, wherein the brightness detection assembly comprises a photometer, a color analyzer, a digital camera, or a computing device of at least one of the group consisting of the same.

18. A light emission control method for a direct-lit backlight diode adapted to a backlight module, wherein the backlight module comprises a first light emission group and a second light emission group, wherein the first light emission group comprises a plurality of first LEDs, and the second light emission group comprises a plurality of second LEDs, wherein the first LEDs and the second LEDs are in an interleaved arrangement, wherein the interleaved arrangement means that the plurality of LEDs in the first light emission group and the second light emission group are disposed at different distances on longitudinal axes and horizontal axes of the backlight module, and the light emission control method comprises:

detecting a light emission status of the LEDs;

sending an abnormal signal when the light emission status of any of the LEDs is an abnormal status;

obtaining a shut-down group according to the abnormal signal; and disabling the shut-down group from emitting light.

19. The light emission control method for a direct-lit backlight diode according to claim 18, wherein the step of disabling the shut-down group from emitting light comprises:

obtaining a first output brightness value of the backlight module;

obtaining a to-be-compensated light emission group from the backlight module when the first output brightness value is less than or equal to a first brightness threshold; and adjusting an operating current of the to-be-compensated light emission group to obtain a second output brightness value of the backlight module.

20. The light emission control method for a direct-lit backlight diode according to claim 19, wherein the step of disabling the shut-down group from emitting light further comprises:

adjusting a color scale of the to-be-compensated light emission group to obtain a third output brightness value when the second output brightness value is less than or equal to a second brightness threshold.

\* \* \* \* \*